US012791774B2

(12) United States Patent
Zhao et al.

(10) Patent No.: US 12,791,774 B2
(45) Date of Patent: Nov. 10, 2026

(54) MULTILAYER OPTICAL FILM

(71) Applicant: 3M INNOVATIVE PROPERTIES COMPANY, St. Paul, MN (US)

(72) Inventors: Lin Zhao, Woodbury, MN (US); Gilles J. Benoit, Minneapolis, MN (US); Stephen A. Johnson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 348 days.

(21) Appl. No.: 18/555,741

(22) PCT Filed: Apr. 5, 2022

(86) PCT No.: PCT/IB2022/053177
§ 371 (c)(1),
(2) Date: Oct. 17, 2023

(87) PCT Pub. No.: WO2022/234361
PCT Pub. Date: Nov. 10, 2022

(65) Prior Publication Data

US 2024/0201427 A1 Jun. 20, 2024

Related U.S. Application Data

(60) Provisional application No. 63/185,426, filed on May 7, 2021.

(51) Int. Cl.
*G02B 5/26* (2006.01)
*G02B 5/30* (2006.01)

(52) U.S. Cl.
CPC ............. *G02B 5/26* (2013.01); *G02B 5/3041* (2013.01); *G02B 5/305* (2013.01); *G02B 5/3083* (2013.01)

(58) Field of Classification Search
CPC ........ G02B 5/26; G02B 5/3083; G02B 5/287; G02B 5/3041; G02B 5/305
See application file for complete search history.

(56) References Cited

U.S. PATENT DOCUMENTS 5,103,337 A 4/1992 Schrenk et al.
5,360,659 A 11/1994 Arends et al.
(Continued)

FOREIGN PATENT DOCUMENTS

EP 2648237 B1 5/2019
JP 2004138938 A * 5/2004
(Continued)

OTHER PUBLICATIONS

International Search Report for PCT International Application No. PCT/IB2022/053177, mailed on Jun. 21, 2022, 4 pages.
(Continued)

*Primary Examiner* — Jia X Pan
(74) *Attorney, Agent, or Firm* — Theresa Stadheim

(57) ABSTRACT

A multilayer optical film includes a plurality of polymeric first layers numbering at least 10 in total where each of the first layers has an average thickness less than about 500 nm. For a p-polarized incident light, and for each of a first incident angle and a second incident angle greater than the first incident angle by at least about 40 degrees: a reflectance of each of the optical film and the plurality of polymeric first layers versus wavelength has a reflection band having a left band edge (LBE) at a short wavelength side of the reflection band and a right band edge (RBE) at a long wavelength side of the reflection band. A separation between the RBEs is less than a separation between the LBEs for the first incident angle, and a separation between the RBEs is greater than a separation between the LBEs for the second incident angle.

6 Claims, 21 Drawing Sheets

(56) References Cited

U.S. PATENT DOCUMENTS

| | | | | |
|---|---|---|---|---|
| 5,540,978 | A | 7/1996 | Schrenk | |
| 5,882,774 | A | 3/1999 | Jonza et al. | |
| 6,179,948 | B1 | 1/2001 | Merrill et al. | |
| 6,207,260 | B1 | 3/2001 | Wheatley et al. | |
| 6,783,349 | B2 | 8/2004 | Neavin et al. | |
| 6,967,778 | B1 | 11/2005 | Wheatley et al. | |
| 8,854,730 | B2 | 10/2014 | Wang et al. | |
| 9,069,136 | B2 | 6/2015 | Weber et al. | |
| 9,162,406 | B2 | 10/2015 | Neavin et al. | |
| 9,477,011 | B2 | 10/2016 | Liu et al. | |
| 10,001,587 | B2 | 6/2018 | Liu | |
| 2005/0079333 | A1 | 4/2005 | Wheatley | |
| 2005/0260384 | A1 | 11/2005 | Ouderkirk | |
| 2007/0122641 | A1 | 5/2007 | Ouderkirk et al. | |
| 2008/0049184 | A1 | 2/2008 | Tan et al. | |
| 2010/0026936 | A1 | 2/2010 | Uesaka | |
| 2013/0250405 | A1 | 9/2013 | Kivel | |
| 2017/0235030 | A1 | 8/2017 | Tanaka et al. | |
| 2019/0154895 | A1 | 5/2019 | Satake et al. | |
| 2020/0319389 | A1* | 10/2020 | Yun | G02B 5/305 |
| 2020/0387003 | A1* | 12/2020 | Yun | G02B 5/305 |

FOREIGN PATENT DOCUMENTS

| | | | | |
|---|---|---|---|---|
| WO | 1999036258 | A1 | 7/1999 | |
| WO | 2012003123 | A1 | 1/2012 | |
| WO | 2012005879 | W | 1/2012 | |
| WO | 2017058562 | A1 | 4/2017 | |
| WO | 2018160866 | A1 | 9/2018 | |
| WO | WO-2019077547 | A1 * | 4/2019 | G02B 27/283 |
| WO | 2020051874 | A1 | 3/2020 | |
| WO | 2020183384 | A1 | 9/2020 | |

OTHER PUBLICATIONS

Jiang, "Multiobjective and Categorical Global Optimization of Photonic Structures Based on ResNet Generative Neural Networks", Nanophotonics, 2021, vol. 10, No. 01, pp. 361-369.

Llic, "Tailoring High-Temperature Radiation and the Resurrection of the Incandescent Source", Nature Nanotechnology, 2016, vol. 11, pp. 320-324.

Shi, "Optimization of Multilayer Optical Films with a Memetic Algorithm and Mixed Integer Programming", ACS Photonics, 2018, vol. 05, No. 03, pp. 684-691.

* cited by examiner

MULTILAYER OPTICAL FILM

CROSS REFERENCE TO RELATED APPLICATIONS

This application is a national stage filing under 35 U.S.C. 371 of PCT/IB2022/053177, filed Apr. 5, 2022, which claims the benefit of U.S. Application No. 63/185,426, filed May 7, 2021, the disclosures of which are incorporated by reference in their entireties herein.

BACKGROUND

A multilayer optical film can include a plurality of alternating polymeric layers to provide a reflection band.

SUMMARY

The present description relates generally to multilayer optical films. A multilayer optical film can have one or more reflection bands. A reflection band can have a left band edge at a short wavelength side of the reflection band where the reflectance generally increases with increasing wavelength, and a right band edge at a long wavelength side of the reflection band where the reflectance generally decreases with increasing wavelength. According to some embodiments of the present description, a multilayer optical film has a reduced shift of one or both of a left and right band edge with incident angle compared to conventional polymeric multilayer optical films. In some embodiments, a reduced band shift is provided by including one or both of a left band edge compensator and a right band edge compensator in a multilayer optical film, where a band edge compensator can be or include a packet of optical layers having a reflectance change with incident angle such that, for example, when combined with another reflector (e.g., an optical mirror or a reflective polarizer) in a multilayer optical film can result in a reduced band edge shift with incident angle. Two band edge compensators may be used together without another reflector, for example, to provide a narrow band reflector with a desirably low band edge shift with incident angle.

In some aspects, the present description provides a multilayer optical film including a plurality of polymeric first layers numbering at least 10 in total disposed on a plurality of polymeric second layers numbering at least 10 in total where each of the first and second layers has an average thickness of less than about 500 nm, such that in a predetermined wavelength range disposed between about 200 nm and about 2000 nm, for a p-polarized incident light, and for each of a first incident angle and a second incident angle greater than the first incident angle by at least about 40 degrees: an optical reflectance of each of the optical film and the plurality of polymeric first layers versus wavelength includes a reflection band having a left band edge (LBE) at a short wavelength side of the reflection band where the reflectance generally increases with increasing wavelength, and a right band edge (RBE) at a long wavelength side of the reflection band where the reflectance generally decreases with increasing wavelength, such that a separation between the RBEs of the optical film and the first layers can be less than a separation between the LBEs of the optical film and the first layers for the first incident angle, and a separation between the RBEs of the optical film and the first layers can be greater than a separation between the LBEs of the optical film and the first layers for the second incident angle.

In some aspects, the present description provides a multilayer optical film including a plurality of polymeric first layers numbering at least 10 in total where each of the first layers has an average thickness of less than about 500 nm, such that in a predetermined wavelength range disposed between about 200 nm and about 2000 nm, and for a substantially normally incident p-polarized incident light, an optical reflectance of each of the optical film and the plurality of polymeric first layers versus wavelength includes a reflection band having a full width at half maximum (FWHM) and a right band edge (RBE) at a long wavelength side of the reflection band where the reflectance generally decreases with increasing wavelength, such that at least one of the two FWHMs overlaps at least 50% of the other one of the two FWHMs, and when an incident angle of the p-polarized incident light increases by at least about 60 degrees, wavelengths at the half maximum reflectances along the RBEs of the optical film and the first layers shift to smaller wavelengths by CS and MS, respectively. CS can be less than MS by at least about 10 nm.

In some aspects, the present description provides a multilayer optical film including a plurality of polymeric first layers numbering at least 10 in total disposed on a plurality of polymeric second layers numbering at least 10 in total where each of the first and second layers has an average thickness of less than about 500 nm, such that in a predetermined wavelength range that is at least about 200 nm wide, and for a p-polarized incident light: for a first incident angle, an optical reflectance of the optical film includes a first reflection band having a peak reflectance that can be greater than about 50%, and the plurality of polymeric first layers has a substantially constant optical reflectance having a standard deviation that can be less than about 3%; and for a second incident angle greater than the first incident angle by at least about 40 degrees, the optical film and the plurality of polymeric first layers have respective second and third reflection bands, each having a peak reflectance that can be greater than about 40%.

In some aspects, the present description provides a multilayer optical film including a plurality of polymeric first layers numbering at least 10 in total disposed on a plurality of polymeric second layers number at least 10 in total where each of the first and second layers has an average thickness of less than about 500 nm, such that in a predetermined wavelength range that is at least about 200 nm wide and is disposed between about 200 nm and about 2000 nm, and for a p-polarized incident light, maximum reflectances of the optical film and the plurality of polymeric first layers are respectively Cmax and Lmax for a first incident angle and C'max and L'max for a second incident angle greater than the first incident angle by at least about 40 degrees. Cmax and Lmax can be within 20% of each other, and C'max can be greater than or equal to 2 L'max.

In some aspects, the present description provides a multilayer optical film including a plurality of polymeric first layers numbering at least 10 in total where each of the first layers have an average thickness of less than about 500 nm, such that in a predetermined wavelength range disposed between about 200 nm and about 2000 nm, and for a p-polarized incident light at a first incident angle, optical reflectances of the optical film and the plurality of polymeric first layers versus wavelength include respective first and second reflection bands having respective full width at half maxima FW1 and FW2. Increasing the incident angle by at least about 40 degrees to a second incident angle, shifts the first and second reflection bands to respective third and fourth reflection bands at smaller wavelengths with respective full width at half maxima FW'1 and FW'2. FW'1 can be less than FW1 by less than about 30%. FW'2 can be less than FW2 by more than about 35%.

In some aspects, the present description provides a multilayer optical film including a plurality of polymeric first layers disposed on, and integrally formed with, a plurality of polymeric second layers, where each of the two pluralities includes at least 10 polymeric layers in total and each of the first and second layers has an average thickness of less than about 500 nm, such that for a p-polarized incident light in a predetermined wavelength range that is at least about 200 nm wide and is disposed between about 200 nm and about 2000 nm: for a first incident angle, an optical reflectance of the plurality of polymeric first layers, but not the plurality of polymeric second layers, versus wavelength includes a reflection band; and for a second incident angle greater than the first incident angle by at least about 40 degrees, an optical reflectance of each of the pluralities of polymeric first layers and the plurality of polymeric second layers versus wavelength can include a reflection band.

In some aspects, the present description provides a multilayer optical film including a plurality of alternating first and second polymeric layers disposed on, and integrally formed with, a plurality of alternating third and fourth polymeric layers and a plurality of alternating fifth and sixth polymeric layers where each of the three pluralities includes at least 10 or at least 20 polymeric layers in total and each of the first through sixth polymeric layers has an average thickness of less than about 500 nm. The first through sixth polymeric layers have respective refractive indices nx1 through nx6 along a same in-plane x-direction, respective refractive indices ny1 through ny6 along an in-plane y-direction orthogonal to the x-direction, and respective refractive indices nz1 through nz6 along a thickness direction of the polymeric layers orthogonal to the x- and y-directions, such that for at least one wavelength in a visible wavelength range extending from about 420 nm to about 680 nm; each of nx1 and ny1 can be greater than nz1 by at least 0.02; a magnitude of a maximum difference between nx3, ny3 and nz3 can be less than 0.02; and each of nx5 and ny5 can be less than nz5 by at least 0.02.

In some aspects, the present description provides a multilayer optical film including a plurality of alternating first and second polymeric layers disposed on, and integrally formed with, a plurality of alternating third and fourth polymeric layers where each of the two pluralities includes at least 10 or at least 20 polymeric layers in total and each of the first through fourth polymeric layers has an average thickness of less than about 500 nm. The first through fourth polymeric layers have respective refractive indices nx1 through nx4 along a same in-plane x-direction, respective refractive indices ny1 through ny4 along an in-plane y-direction orthogonal to the x-direction, and respective refractive indices nz1 through nz4 along a thickness direction of the polymeric layers orthogonal to the x- and y-directions, such that for at least one wavelength in a visible wavelength range extending from about 420 nm to about 680 nm; each of $|nx1-nx2|$ and $|ny1-ny2|$ is less than about 0.02; $nz1-nz2$ is greater than about 0.03; nx1 can be less than nz1 by at least about 0.02; $nx4-nx3$ is greater than about 0.03; $nz4-nz3 \geq nx4-nx3$; and nx3 can be greater than nz3 by at least about 0.02. In some embodiments, for the at least one wavelength, a magnitude of a maximum difference between nx4, ny4 and nz4 can be less than about 0.02. In some other embodiments, for the at least one wavelength, nx4 can be greater than ny4 by at least about 0.03.

In some aspects, the present description provides a multilayer optical film including a plurality of polymeric first layers disposed on, and integrally formed with, a plurality of polymeric second layers where each of the two pluralities includes at least 10 polymeric layers in total and each of the first and second layers has an average thickness of less than about 500 nm, such that for a p-polarized incident light in a predetermined wavelength range that is at least about 200 nm wide and is disposed between about 200 nm and about 2000 nm; for a first incident angle, an optical reflectance of the plurality of polymeric first layers, but not the plurality of polymeric second layers, versus wavelength includes a reflection band where the reflection band can have a full width at half maximum (FWHM) of greater than about 10 nm; and for a second incident angle greater than the first incident angle by at least about 40 degrees, an optical reflectance of each of the plurality of polymeric first layers and the plurality of polymeric second layers versus wavelength includes a reflection band where each of the reflection bands can have a FWHM of greater than about 10 nm.

In some aspects, the present description provides a multilayer optical film including a plurality of polymeric first layers disposed on, and integrally formed with, a plurality of polymeric second layers where each of the two pluralities includes at least 10 polymeric layers in total and each of the first and second layers has an average thickness of less than about 500 nm, such that for a p-polarized incident light in a predetermined wavelength range that is at least about 200 nm wide and is disposed between about 200 nm and about 2000 nm, and for at a first incident angle greater than about 30 degrees: an optical reflectance of each of the optical film, the plurality of polymeric first layers, and the plurality of polymeric second layers versus wavelength includes a reflection band having a left band edge (LBE) at a short wavelength side of the reflection band where the reflectance generally increases with increasing wavelength, and a right band edge (RBE) at a long wavelength side of the reflection band where the reflectance generally decreases with increasing wavelength, such that the RBE of the optical film substantially overlaps the RBE of one of the pluralities of first and second layers, and the LBE of the optical film substantially overlaps the LBE of the other one of the pluralities of first and second layers.

In some aspects, the present description provides a multilayer optical film including a plurality of polymeric first layers disposed on, and integrally formed with, a plurality of polymeric second layers where each of the two pluralities includes at least 10 polymeric layers in total and each of the first and second layers has an average thickness of less than about 500 nm, such that for a p-polarized incident light in a predetermined wavelength range that is at least about 200 nm wide and is disposed between about 200 nm and about 2000 nm: for a first incident angle, an optical reflectance of each of the optical film and the plurality of polymeric first layers, but not the plurality of polymeric second layers, versus wavelength includes a reflection band where the reflection bands have full width at half maximums (FWHM) within about 20% of each other; and for a second incident angle greater than the first incident angle by at least about 40 degrees, an optical reflectance of each of the optical film and the plurality of polymeric first layers versus wavelength includes a reflection band where the reflection bands can have FWHMs different by at least about 30%.

In some aspects, the present description provides a multilayer optical film including a plurality of layers numbering at least 10 in total where each of the layers has an average thickness of less than about 500 nm, such that for a p-polarized incident light in a predetermined wavelength range that is at least about 200 nm wide and is disposed between about 200 nm and about 2000 nm, and for increasing first, second, and third incident angles, an optical reflectance of the optical film versus wavelength comprises respective first, second, and third reflection bands having respective full width at half maximums, F1, F2, and F3, where F3>F1>F2.

In some aspects, the present description provides a multilayer optical film including a plurality of alternating first and second polymeric layers disposed on, and integrally formed with, a plurality of alternating third and fourth polymeric layers where each of the two pluralities includes at least 10 polymeric layers in total and each of the first through fourth polymeric layers has an average thickness of less than about 500 nm, such that for an unpolarized incident light in a predetermined wavelength range that is at least about 200 nm wide and is disposed between about 200 nm and about 2000 nm, an optical reflectance of the optical film versus wavelength includes a reflection band having a full width at half maximum of less than about 100 nm for at least a first incident angle less than about 25 degrees, and for at least one first wavelength in the reflection band, the optical reflectance of the optical film is greater than about 50% for each of the first incident angle and a second incident angle greater than the first incident angle by at least about 60 degrees.

These and other aspects will be apparent from the following detailed description. In no event, however, should this brief summary be construed to limit the claimable subject matter.

DETAILED DESCRIPTION

Figure 1A:
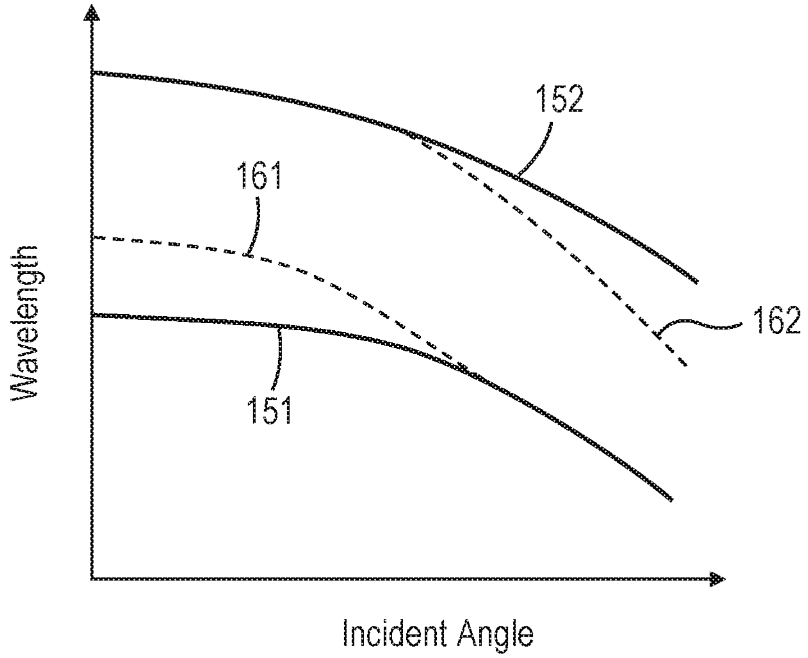
FIGS. 1A-1B are schematic plots of band edge wavelengths versus incident angle, according to some embodiments.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Multilayer optical films including alternating polymeric layers can be used to provide desired reflection and transmission in desired wavelength ranges by suitable selection of layer thicknesses and refractive index differences as generally described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example. The alternating polymeric layers typically include alternating high and low index layers which can be described as optical layers that transmit and reflect light primarily by optical interference. A multilayer optical film including alternating high and low index layers can be described as including a plurality of optical repeat units where each optical repeat unit includes a high index layer and a low index layer. An optical repeat unit is generally the smallest distinct unit of optical layers that repeats along a thickness direction of the optical film. Each optical repeat unit may include one or more layers in addition to the high and low index layers as described in U.S. Pat. No. 5,103,337 (Schrenk et al.); U.S. Pat. No. 5,540,978 (Schrenk) and U.S. Pat. No. 6,207,260 (Wheatley et al.), for example.

A multilayer optical film can have one or more reflection bands. A reflection band can have a left band edge (LBE) at a short wavelength side of the reflection band where the reflectance generally increases with increasing wavelength, and a right band edge (RBE) at a long wavelength side of the reflection band where the reflectance generally decreases with increasing wavelength. For a conventional polymeric multilayer optical film, the band edges shift significantly with changing incident angle. For example, for a conventional optical film including alternating layers polyethylene terephthalate (PET) and co-polymethylmethacrylate (coPMMA) and having a reflection band in visible and near-infrared wavelength ranges, the right band edge shifts about 130 nm to lower wavelengths when the incident angle changes from 0 to 75 degrees. For many applications, such a shift is undesired.

According to some embodiments of the present description, a multilayer optical film has a reduced shift of one or both of an LBE and an RBE with incident angle compared to conventional polymeric multilayer optical films. For example, the right band edge shift of about 130 nm for the PET/coPMMA reflector can be reduced to a shift of about 100 nm. In some embodiments, a reduced band shift is provided by including one or both of an LBE compensator and an RBE compensator in a multilayer optical film. As described further elsewhere herein, a band edge compensator can be or include a packet of optical layers having a reflectance change with incident angle such that when combined with another reflector in a multilayer optical film, for example, can result in a reduced band edge shift with incident angle compared to the optical film without the band edge compensator.

A multilayer optical film of the present description can include an LBE compensator with a first reflector (e.g., a conventional polymeric optical film). In some embodiments, the first reflector, which may also be referred to as a main reflector or primary reflector, provides a majority of a width of a reflection band. For example, a reflection band for each of the optical film and the primary reflector can have a full width at half maximum (FWHM), such that for a first incident angle, each of the two FWHMs overlaps greater than 50%, or at least about 60%, or at least about 70%, or at least about 75% of the other of the two FWHMs. The LBE compensator generally reduces a shift in an LBE of the first reflector with incident angle and can include a plurality (or packet) of polymeric layers that can include alternating first and second optical layers where the first optical layers have a higher refractive index along a first in-plane direction than that of the second optical layers for a same first wavelength and where a difference in refractive indices between the first and second layers along a thickness direction (orthogonal to each of the first in-plane direction and an orthogonal second in-plane direction) is at least as large as a difference in refractive indices between the first and second layers along the first in-plane direction for the same first wavelength. The multilayer optical film can be a reflective polarizer (e.g., the first in-plane direction can be along a block axis) or can be an optical mirror (e.g., the refractive indices along the second in-plane direction can be about the same as the corresponding refractive indices along the first in-plane direction), for example. For an incident plane (plane defined by the direction of the light and the normal to the surface on which the light is incident) comprising the first in-plane direction and for p-polarized light (electric field parallel to the incident plane), the LBE compensator typically has a high on-axis reflectance (e.g., similar to that of the first reflector) and the reflectance decreases as the incidence angle increases due to a Brewster angle effect and due to the refractive index mismatch in the thickness direction. By positioning the normal incidence reflection band of the LBE compensator at wavelengths overlapping the LBE of the first reflector, the position of the LBE is shifted to lower wavelengths for low incident angles due to the reflection of the LBE compensator and is substantially unshifted for high incident angles where the reflection of the LBE compensator is weak. The result is a reduced shift in the LBE of the multilayer optical film compared to that of the first reflector. This is schematically illustrated in FIG. 1A which also illustrates a reduced shift in an RBE resulting from an RBE compensator as described further elsewhere herein.

Figure 1B:
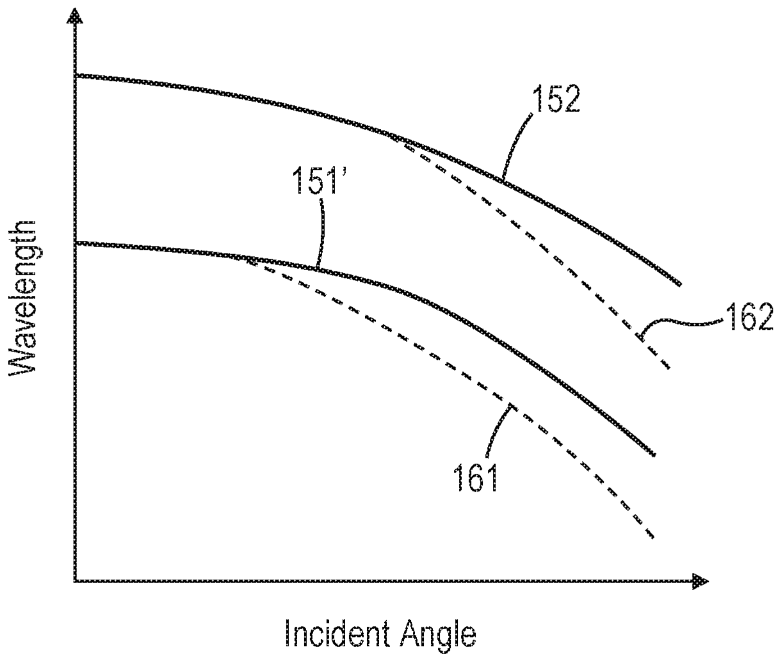

FIG. 1A is a schematic plot of band edge wavelengths versus incident angle for p-polarized light, according to some embodiments. A band edge wavelength may be taken to be the wavelength along the band edge where the reflectance is halfway between a baseline reflectance for wavelengths outside of the reflection band and a maximum reflectance in the reflection band (see, e.g., U.S. Pat. No. 10,054,803 (Wold et al.)), or the band edge wavelength may be taken to be the wavelength along the band edge where the reflectance is half the maximum reflectance in the reflection band, or the band edge wavelength may be taken to be the wavelength along the band edge where the reflectance is 50%. An incident angle is an angle of a direction of light incident on a surface relative to a normal to the surface and is in a range of 0 degrees to 90 degrees. LBE and RBE wavelength curves 161 and 162 (band edge wavelength as a function of incident angle) for a first reflector (e.g., a conventional polymeric optical film) are schematically indicated. An LBE wavelength curve 151 for a multilayer optical film including an LBE compensator and the first reflector is schematically indicated. The LBE compensator reduces the LBE wavelengths from that of the first reflector for low incidence angles to reduce the LBE shift. Alternatively, when the LBE compensator is included in the multilayer optical film, for example, the first reflector can be modified (e.g., by eliminating optical layers adapted to reflect near the original LBE wavelengths 161) to shift the LBE wavelengths of the first reflector to longer wavelengths so that when an LBE compensator is included, the multilayer optical film has a reflection band at normal incidence similar to that of the unmodified first reflector. This is schematically illustrated in FIG. 1B where the LBE wavelength curve 151' for the multilayer optical film is similar to the LBE wavelength curve 161 for smaller incidence angles and is at higher wavelengths than the LBE wavelength curve 161 for larger incidence angles.

For s-polarized light (electric field orthogonal to the incident plane) in an incident plane orthogonal to the first in-plane direction (e.g., light can have an electric field parallel to the first in-plane direction), the LBE compensator may have a band edge shift similar to that of the first reflector, which is typically smaller than the band edge shift of the first reflector for p-polarized light. Thus, the LBE compensator can reduce the band edge shift of p-polarized light and maintains the low band edge shift characteristic of s-polarized light, according to some embodiments.

A multilayer optical film of the present description can include an RBE compensator with a first reflector (e.g., a conventional polymeric optical film). The RBE compensator generally reduces a shift in an RBE of the first reflector with incident angle and can include a plurality (or packet) of polymeric layers that can include alternating first and second optical layers where the first and second optical layers have substantially matched (e.g., to within about 0.02 or to within about 0.015) refractive indices along each of orthogonal first and second in-plane directions and have substantially mismatched refractive indices (e.g., differing by greater than about 0.02 or by at least about 0.03) along a thickness direction orthogonal to each of the first and second in-plane directions for a same first wavelength. The RBE compensator typically has a low reflectance at normal incidence for each polarization state. For p-polarized light, the RBE compensator typically has an increasing reflectance as the incidence angle increases due to the refractive index mismatch in the thickness direction. By positioning the reflection band of the RBE compensator at wavelengths overlapping the RBE of the first reflector at high incidence angles, the position of the RBE is shifted to longer wavelengths for higher incident angles due to the reflection of the RBE compensator and is substantially unshifted for low incident angles where the reflection of the RBE compensator is weak. The result is a reduced shift in the RBE of the multilayer optical film compared to that of the first reflector. This is schematically illustrated in FIGS. 1A-1B where an RBE wavelength curve 152 for a multilayer optical film including an RBE compensator and the first reflector is schematically indicated. The RBE wavelength curve 152 is at longer wavelengths than the RBE wavelength curve 162 of the first reflector at higher incident angles resulting in a reduced RBE shift. For s-polarized light, the RBE compensator can have a reflectance that increases similarly to that of a conventional multilayer optical film so that the RBE maintains the low band edge shift characteristic s-polarized light, according to some embodiments.

In some embodiments, a multilayer optical film of the present description includes an RBE compensator and an LBE compensator with a first reflector (e.g., a conventional polymeric optical film) to reduce the shift with incidence angle of both the LBE and the RBE of the first reflector. In other embodiments, only one of the RBE and LBE compensators is included. In some embodiments, the multilayer optical film includes RBE and LBE compensators without including the first reflector. The combination of an RBE and an LBE compensator can result in a narrow band reflector with reduced LBE and RBE band edge shifts with incident angle compared to that of conventional polymeric optical films having a similar narrow reflection band at normal incidence. In some embodiments, the reflection band has a full width at half maximum of less than about 100 nm at normal incidence and there is at least one wavelength were the optical film has a reflectance greater than about 50% over a range on incident angles from zero to about 75 degrees, for example. In comparison, for a conventional optical film having a narrow reflection band at normal incidence, there is no wavelength where the reflectance remains above about 50% for a wide range of incident angles due to the shift of the band edges with incident angles.

Figure 2A:
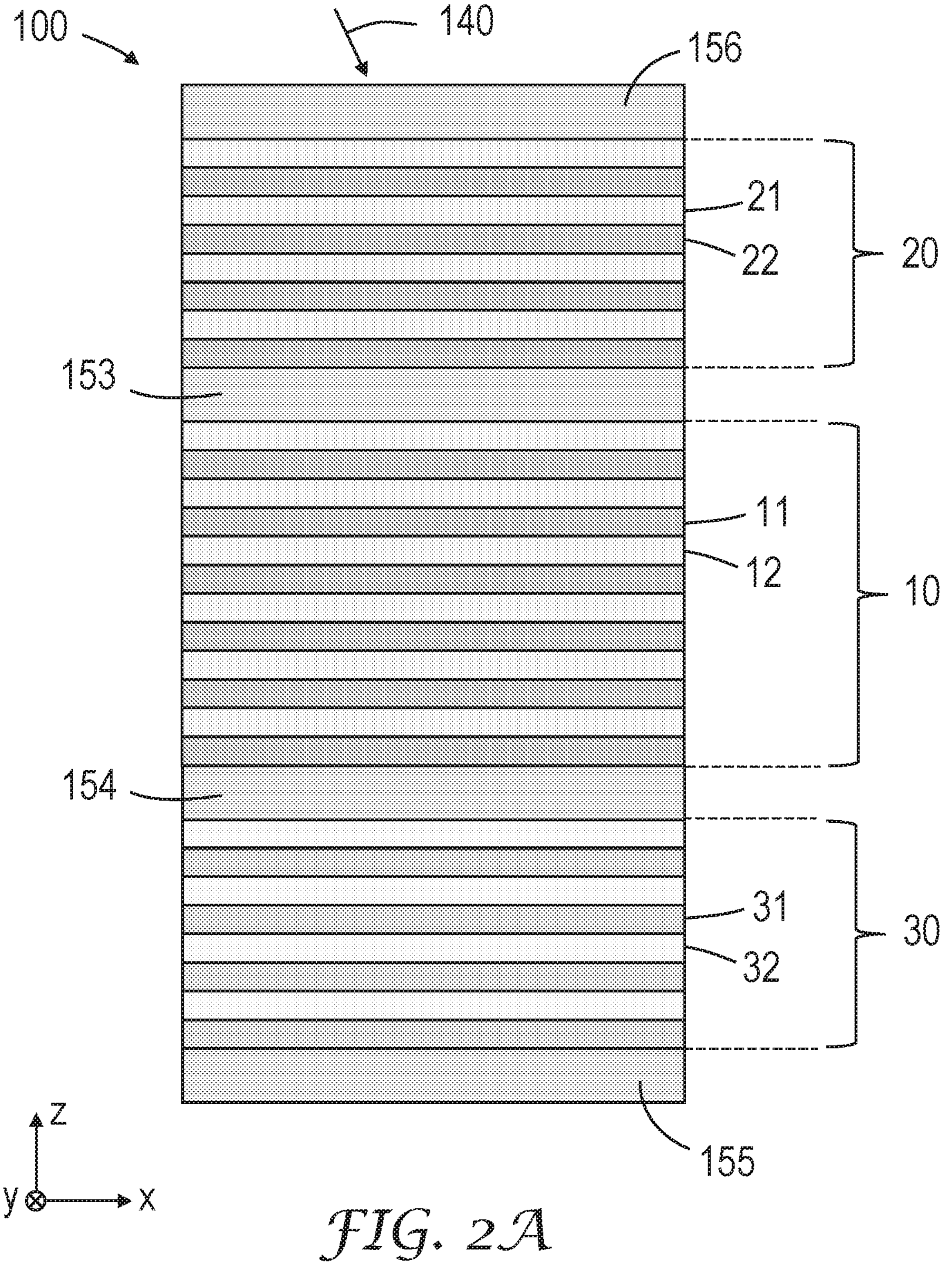
FIGS. 2A-2B are schematic cross-sectional views of multilayer optical films, according to some embodiments.

FIG. 2A is a schematic cross-sectional view of a multilayer optical film 100 including a plurality 10 of layers 11, 12; a plurality 20 of layers 21, 22; and a plurality 30 of layers 31, 32. In some embodiments, one of the pluralities 10, 20, 30 of layers is a first reflector (e.g., an optical mirror or a reflective polarizer), a different one of the pluralities 10, 20, 30 of layers is an LBE compensator, and the remaining one of the pluralities 10, 20, 30 of layers is an RBE compensator. In some embodiments, any one of the pluralities 10, 20, 30 of layers (e.g., any one of the first reflector, the LBE compensator, or the RBE compensator) is omitted. In some cases, one of the pluralities 10, 20, and 30 may be referred to as a plurality of polymeric first layers; and one of the other two of the pluralities 10, 20, and 30 may be referred to as a plurality of polymeric second layers or the other two of the pluralities 10, 20, and 30 may be collectively referred to as a plurality of polymeric second layers. The pluralities 10, 20, 30 of layers can be arranged in any order with any one of the three pluralities 10, 20, 30 disposed between the other two of the three pluralities (e.g., the plurality 10 of layers can be disposed between the pluralities 20 and 30 of layers as illustrated, or the plurality 20 of layers can be disposed between the pluralities 10 and 30 of layers, or the plurality 30 of layers can be disposed between the pluralities 10 and 20 of layers). Regardless of where the pluralities of layers are disposed in the multilayer optical film relative to one another, the layers of an LBE compensator may be referred to as the left layers or the left packet, the layers of an RBE compensator may be referred to as the right layers or the right packet, and the layers of a first or main reflector may be referred to as the middle layers or the middle packet since the reflection provided by the LBE compensator is generally to the left of the reflection provided by the RBE compensator (in a plot of reflectance versus wavelength for some incidence angles—see, e.g., FIG. 5B) and the reflection provided by the main reflector is in between those provided by the LBE and RBE compensator. The reflectance of the multilayer optical film may be referred to as the combined reflectance of the various layers or pluralities of layers of the film. The reflectance may be characterized for an incident light 140 at various incident angles and/or for various polarization states (e.g., p-polarized light, s-polarized light, or unpolarized light) as described further elsewhere herein.

Figure 2B:
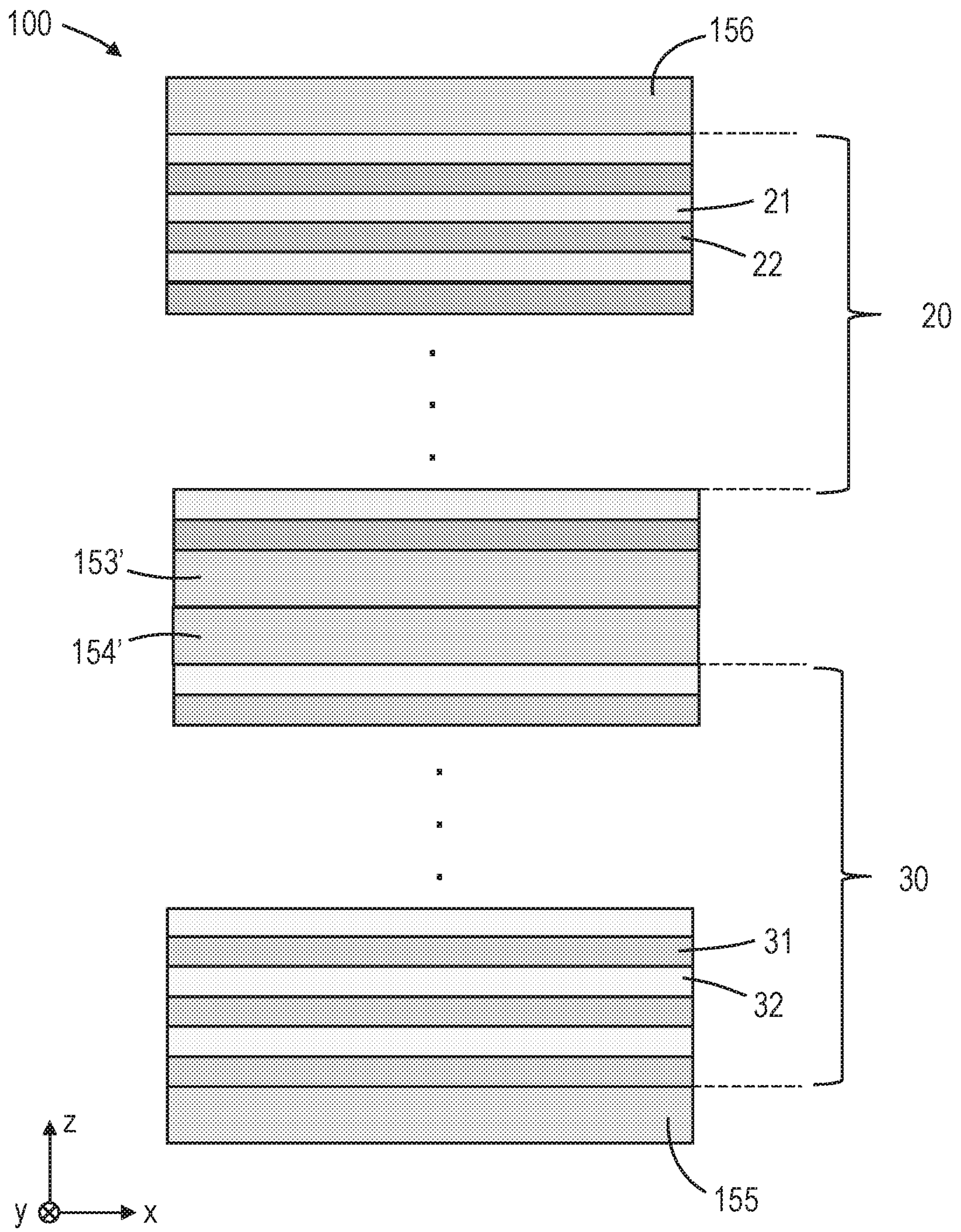

Each of the pluralities of layers 10, 20, 30, when included in the optical film 100, may include at least 10 layers in total, or at least 20 layers in total, or at least 30 layers in total, or at least 40 layers in total, for example, and may include up to 1000 layers in total, or up to 600 layers in total, or up to 400 layers in total, or up to 300 layers in total, for example. In some embodiments, the total number of layers 11, 12, 21, 22, 31, 32 may be at least 10, or at least 20, or at least 40, or at least 60, or at least 100 and/or may be less than 2000, or less than 1000, for example. The pluralities of layers 10, 20, and/or 30 may include many more layers than schematically illustrated in FIG. 2A. This is schematically illustrated in FIG. 2B, for example, for the plurality 20 of layers 21, 22 and the plurality 30 of layers 31, 32. In the embodiment of FIG. 2B, the plurality 10 of layers 11, 12 are omitted.

Figure 2C:
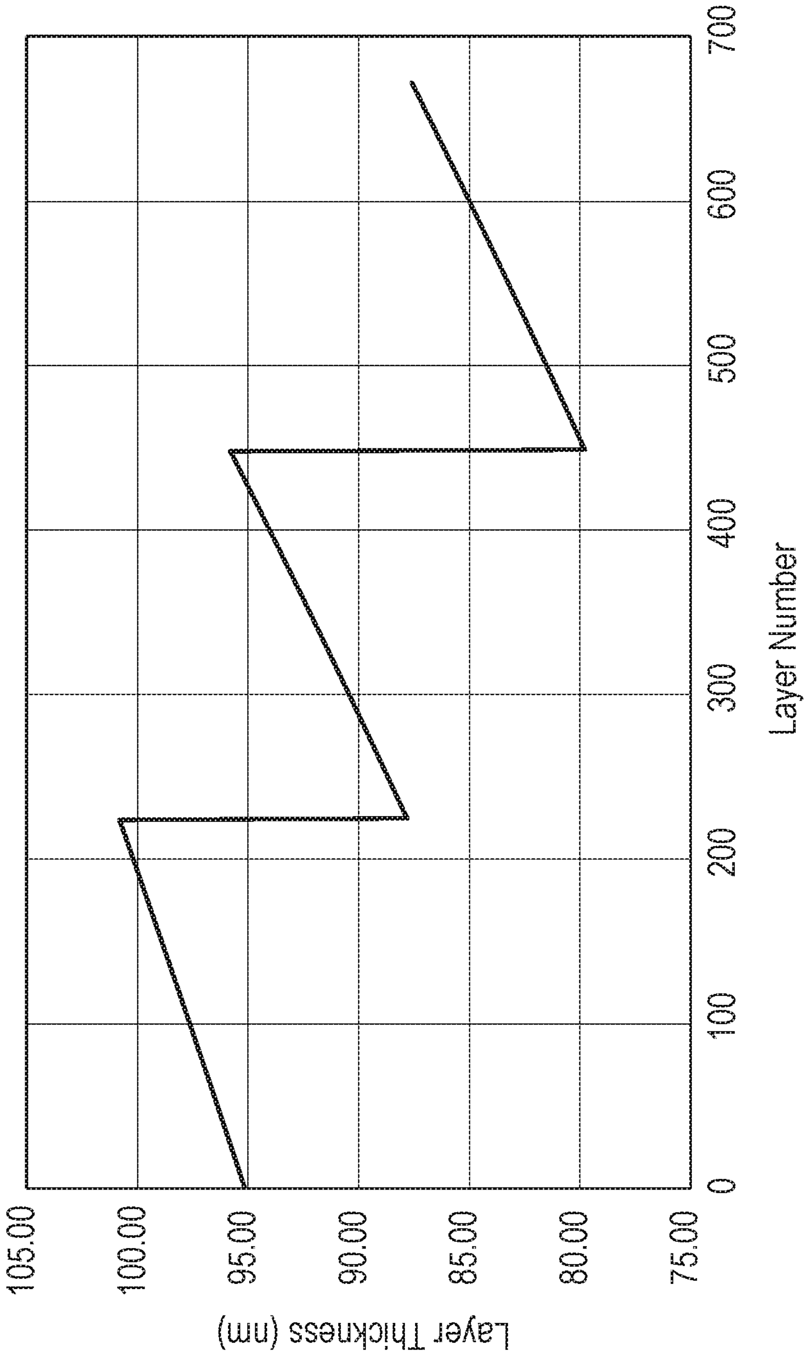
FIG. 2C is a plot of average layer thickness of layers of a multilayer optical film as a function of layer number, according to some embodiments.

The layers of the pluralities 10, 20, 30 of layers, which may be referred to as optical layers, may each have an average thickness of less than about 500 nm, or less than about 400 nm, or less than about 300 nm, or less than about 250 nm, or less than about 200 nm, for example. Each of the layers may have an average thickness greater than about 30 nm, or greater than about 40 nm, or greater than about 50 nm, or greater than about 60 nm, for example. An average thickness of a layer is the unweighted mean over the area of the layer of the thickness of the layer. The layers in the pluralities of layers 10, 20, 30 may be sequentially numbered from one side of the optical film 100 to an opposite side of the optical film. FIG. 2C is a plot of average layer thickness of the layers in the pluralities of layers 10, 20 and 30 as a function of layer number, according to some embodiments.

Each of the pluralities 10, 20, 30 of layers may include layers arranged into optical repeat units where the optical repeat units include at least first and second optical layers (e.g., layers 11, 12; or 21, 22; or 31, 32). The optical repeat units may include only the first and second optical layers or may include one or more additional layers. For example, the optical repeat units may include one or more thin (e.g., less than half the thickness of each the first and second optical layers) layers for improved delamination resistance.

The multilayer optical film 100 may include layers in addition to the pluralities 10, 20, 30 of layers. Some of these layers may have a thickness greater than about 500 nm. For example, the optical film 100 can include skin layers 155 and 156 as outermost layers of the optical film that each has an average thickness greater than about 500 nm, or greater than about 1 micrometer, or greater than about 2 micrometers. The skin layers 155, 156 can have a thickness up to about 20 micrometers, for example. The optical film 100 may also include protective boundary layers 153, 154 or 153', 154' between adjacent pluralities 10, 20, or 30 of layers where the protective boundary layers 153, 154, 153', 154' can have average thicknesses greater than about 1 micrometer, or greater than about 2 micrometers or in any of the ranges described for the skin layers 155, 156. In some embodiments, a plurality (e.g., one of 10, 20, or 30) of layers can include two or more packets of layers separated by a protective boundary layer, for example.

As used herein, a first element "integrally formed" with a second element means that the first and second elements are manufactured together rather than manufactured separately and then subsequently joined. Integrally formed includes manufacturing a first element followed by manufacturing the second element on the first element. An optical film including pluralities of layers is integrally formed if the pluralities of layers are manufactured together (e.g., combined as melt streams and then cast onto a chill roll to form a cast film having each of the layers, and then orienting the cast film) rather than manufactured separately and then subsequently joined.

Suitable materials for the various layers in the multilayer optical film 100 include, for example, polyethylene naphthalate (PEN), coPEN (copolyethylene naphthalate terephthalate copolymer), polyethylene terephthalate (PET), polyhexylethylene naphthalate copolymer (PHEN), glycol-modified PET (PETG), glycol-modified PEN (PENG), various other copolyesters such as those described elsewhere herein, syndiotactic polystyrene (sPS), polymethyl methacrylate (PMMA), coPMMA (a copolymer of methyl methacrylate and ethyl acrylate), or blends thereof. Other suitable materials for the various layers in the multilayer optical film 100 include those described in U.S. Pat. No. 5,103,337 (Schrenk et al.); U.S. Pat. No. 5,540,978 (Schrenk); U.S. Pat. No. 5,882,774 (Jonza et al.); U.S. Pat. No. 6,179,948 (Merrill et al.); U.S. Pat. No. 6,207,260 (Wheatley et al.); U.S. Pat. No. 6,783,349 (Neavin et al.); U.S. Pat. No. 6,967,778 (Wheatley et al.); U.S. Pat. No. 9,069,136 (Weber et al.); and U.S. Pat. No. 9,162,406 (Neavin et al.), for example. Suitable sPS can be obtained from Idemitsu Kosan Co., Ltd. (Tokyo, Japan), for example. Atactic polystyrene (aPS) can optionally be blended with sPS (e.g., at about 5 to about 30 weight percent aPS) to adjust the refractive indices of the resulting layer and/or to reduce the haze of the layer (e.g., by reducing a crystallinity of the layer). Suitable PMMA can be obtained from Arkema Inc., Philadelphia, PA., for example. Suitable PET can be obtained from Nan Ya Plastics Corporation. America (Lake City. SC), for example, PETG can be described as PET with some of the glycol units of the polymer replaced with different monomer units, typically those derived from cyclohexanedimethanol. PETG can be made by replacing a portion of the ethylene glycol (e.g., about 15 to about 60 mole percent or about 30 to about 40 mole percent) used in the transesterification reaction producing the polyester with cyclohexanedimethanol, for example. Suitable PETG copolyesters include GN071 available from Eastman Chemical Company (Kingsport. TN). PEN and coPEN can be made as described in U.S. Pat. No. 10,001,587 (Liu), for example. Glycol-modified polyethylene naphthalate (PENG) can be described as PEN with some of the glycol units of the polymer replaced with different monomer units and can be made by replacing a portion of the ethylene glycol (e.g., about 15 to about 60 mole percent or about 30 to about 40 mole percent) used in the transesterification reaction producing the polyester with cyclohexanedimethanol, for example. PHEN can be made as described for PEN in U.S. Pat. No. 10,001,587 (Liu), for example, except that a portion of the ethylene glycol (e.g., about 15 to about 60 mole percent, or about 30 to about 50 mole percent, or about 40 mole percent) used in the transesterification reaction is replaced with hexanediol. Other suitable copolyesters include those available under the TRITAN tradename from Eastman Chemical Company (Kingsport, TN) and OKP-1 available from Osaka Gas Chemicals Co., Ltd. (Osaka, Japan), for example.

A copolyester may include aromatic and aliphatic groups. Refractive indices of such copolyesters can be adjusted by suitable selection of the types and amounts of the aromatic and aliphatic groups. For example, reducing the aromatic content of a copolyester generally reduces the overall refractive index of the copolyester and the birefringence of an oriented layer of the copolyester. As another example, using aromatic groups including two fused aromatic rings (e.g., as in PEN) gives a higher birefringence after orientation than using aromatic groups having a single aromatic ring (e.g., as in PET). As still another example, incorporating stilbene groups has been found to generally increase refractive indices and birefringence. As yet another example, replacing a portion of dimethyl terephthalate or terephthalic acid in PET with dimethyl cyclohexanedicarboxylate, which replaces an aromatic ring with an aliphatic ring, generally reduces birefringence. Related useful copolyesters are described in U.S. Pat. No. 9,477,011 (Liu ct al.), for example.

Figure 3:
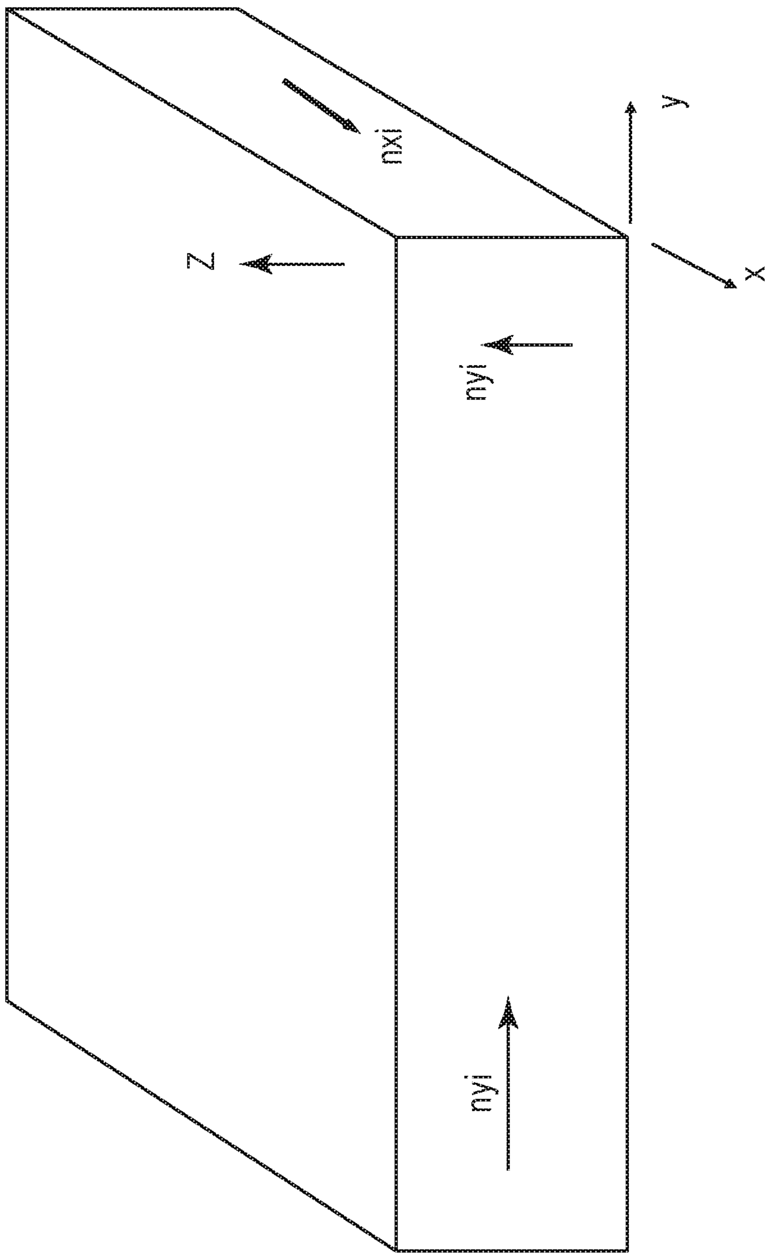
FIG. 3 is a schematic perspective view of an illustrative layer of a multilayer optical film.

Various layers of the multilayer optical film 100 may be characterized by their refractive indices in a first in-plane direction (e.g., x-direction), an orthogonal second in-plane direction (e.g., y-direction) and/or along a thickness direction (z-direction) orthogonal to the first and second in-plane directions. In embodiments where refractive indices for multiple layers are specified, the refractive indices along the x-, y-, and z-directions may be denoted nxi, nyi, nzi, respectively, with "i" being 1, 2, etc. FIG. 3 is a schematic perspective view of an illustrative layer of a multilayer optical film. Refractive indices nxi, nyi, nzi along x-, y-, and z-directions are indicated for a layer "i" which may correspond, for example, to any of layers 11, 12, 21, 22, 31, or 32 illustrated in FIG. 2A. Refractive indices may be specified for at least one wavelength in a predetermined wavelength range described elsewhere herein and/or for at least one wavelength in a visible range extending from about 400 nm to about 700 nm, or from about 420 nm to about 680 nm, or from about 450 nm to about 650 nm, for example. The at least one wavelength may be or include at least one of a wavelength of about 532 nm, a wavelength of about 550 nm, a wavelength of about 589 nm, or a wavelength of about 633 nm, for example. Refractive indices, also referred to as indices of refraction, may be measured using a refractometer, for example, according to the ASTM D542-14 test method, for example.

In some embodiments, a multilayer optical film includes a plurality of polymeric layers (e.g., one of the pluralities 10, 20, or 30) for reducing a shift in a left band edge with changing incident angle (e.g., an LBE compensator). In some embodiments, the plurality of polymeric layers includes a plurality of alternating first and second optical layers having respective refractive indices nx1 and nx2 along a same in-plane x-direction, respective refractive indices ny1 and ny2 along an in-plane y-direction orthogonal to the x-direction, and respective refractive indices nz1 and nz2 along a thickness direction (z-direction) of the polymeric layers orthogonal to the x- and y-directions, where for at least one wavelength in a predetermined wavelength range, $nz2-nz1 \geq nx2-nx1 \geq 0.02$. Optical reflectance may be specified for p-polarized incident light incident on the multilayer optical film in an incident plane comprising the x-direction, for example. The predetermined wavelength range can be a wavelength range where the multilayer optical film is configured to have a reflection band, as described further elsewhere herein (e.g., the predetermined wavelength range may be a visible wavelength range extending from about 420 nm to about 680 nm). The alternating layers may alternatively be labeled differently, for example, when other alternating layers are described. For example, the plurality of polymeric layers may be described as including alternating third and fourth optical layers having respective indices nx3 and nx4 along the x-direction, respective indices ny3 and ny4 along the y-direction, and respective indices nz3 and nz4 along the thickness direction (z-direction). In this case, the previous relation among refractive indices for the at least one wavelength in the predetermined wavelength range may be written as nz4−nz3≥nx4−nx3≥0.02. More generally, the relation may be written as nzj−nzi≥nxj−nxi≥0.02, where "i" and "j" are integers labeling "$i^{th}$" and "$j^{th}$" layers. The difference nzj−nzi for the at least one wavelength may be denoted Δnz, the difference nxj−nxi for the at least one wavelength may be denoted Δnx, and similarly the difference nyj−nyi for the at least one wavelength may be denoted Δny. In some embodiments where Δnz≥Δnx≥0.02, Δnx is greater than or equal to 0.025, or 0.03, or 0.04, or 0.05, or 0.06. In some embodiments, Δnz≥Δnx, and Δnx is greater than about 0.02, or greater than about 0.025, or greater than about 0.04, or greater than about 0.05, or greater than about 0.06. In some embodiments where Δnz≥Δnx≥0.02, Δnz≥Δny≥0.02. In some such embodiments, Δny is greater than or equal to 0.025, or 0.03, or 0.04, or 0.05, or 0.06. In some embodiments, Δnz≥Δny, and Δny is greater than about 0.02, or greater than about 0.025, or greater than about 0.04, or greater than about 0.05, or greater than about 0.06. In some embodiments, Δnz−Δnx is greater than or equal to 0.01, or 0.015, or 0.02, or 0.025, or 0.03, or 0.035, or 0.04. In some such embodiments, or in other embodiments, Δnz−Δny is greater than or equal to 0.01, or 0.015, or 0.02, or 0.025, or 0.03, or 0.035, or 0.04. Δnx and Δny may each be up to about 0.2, or up to about 0.15, or up to about 0.12, or up to about 0.1, for example. Δnz may be up to about 0.22, or up to about 0.2, or up to about 0.18, or up to about 0.16, for example. Δnz−Δnx, and/or Δnz−Δny, may be up to about 0.1, or up to about 0.08, or up to about 0.06, for example.

In some embodiments, for the at least one wavelength (and for layers of an LBE compensator, for example), nxi (e.g., nx1 or nx3) is greater than nzj (e.g., nz1 or nx3) by at least about 0.02, or at least about 0.025, or at least about 0.03, or at least about 0.04, or at least about 0.05. In some such embodiments, or in other embodiments, for the at least one wavelength, a magnitude of a maximum difference between nxj, nyj and nzj (e.g., nx2, ny2 and nz2; or nx4, ny4 and nz4) is less than about 0.02, or less than about 0.015, or less than about 0.012, or less than about 0.01. In some such embodiments, or in other embodiments, for the at least one wavelength, each of nxj and nyj is greater than each of nxi and nyi by at least about 0.02, or at least about 0.03, or at least about 0.04, or at least about 0.05, or at least about 0.06. Each of nxj and nyj may be greater than each of nxi and nyi by up to about 0.2, or up to about 0.15, or up to about 0.12, or up to about 0.1, for example. In some embodiments, for the at least one wavelength, an absolute value of a difference between the refractive index of the first optical layer (or the $i^{th}$ optical layer) along the x-direction and the refractive index of the first optical layer (or the $i^{th}$ optical layer) along the y-direction is less than about 0.05, or less than about 0.04, or less than about 0.03, or less than about 0.025, or less than about 0.02, or less than about 0.015, or less than about 0.012, or less than about 0.01. In some embodiments, for the at least one wavelength and for each of the first and second optical layers (or for each of the $i^{th}$ and $j^{th}$ optical layers), an absolute value of a difference between the refractive index of the layer along the x-direction and the refractive index of the layer along the y-direction is less than about 0.05, or less than about 0.04, or less than about 0.03, or less than about 0.025, or less than about 0.02, or less than about 0.015, or less than about 0.012, or less than about 0.01.

Suitable materials for the $i^{th}$ (e.g., first or third) optical layers (e.g., of an LBE compensator) include copolyesters such as those available under the TRITAN trade name from Eastman Chemical Company, for example. Suitable materials for the $j^{th}$ (e.g., second or fourth) optical layers (e.g., of an LBE compensator) include PHEN, PENG, or OKP-1, for example. For example, the $i^{th}$ optical layers may be TRITAN copolyester layers having refractive indices of 1.561, 1.561, and 1.529 in the x-, y-, and z-directions, respectively, at a wavelength of 633 nm while the $j^{th}$ optical layers may be OKP-1 layers having isotropic refractive indices of about 1.64 at a wavelength of 633 nm or may be PENG or PHEN layers having isotropic refractive indices of about 1.63 at a wavelength of 633 nm.

In some embodiments, a multilayer optical film includes a plurality of polymeric layers (e.g., one of the pluralities 10, 20, or 30) for reducing a shift in a right band edge with changing incident angle (e.g., an RBE compensator). In some embodiments, the plurality of polymeric layers includes a plurality of alternating first and second optical layers having respective indices nx1 and nx2 along a same in-plane x-direction, respective indices ny1 and ny2 along an in-plane y-direction orthogonal to the x-direction, and respective indices nz1 and nz2 along a thickness direction (z-direction) of the polymeric layers orthogonal to the x- and y-directions, where for at least one wavelength in the predetermined wavelength range; each of |nx1−nx2| and |ny1−ny2| is less than about 0.02; and nz1−nz2 is greater than about 0.02 or greater than about 0.03. As described further elsewhere herein, the first and second layers may be labeled differently. For example, the layers may be referred to as third and fourth layers, or fifth and sixth layers, or, more generally, "$i^{th}$" and "$j^{th}$" layers. In some embodiments, for the at least one wavelength, each of each of |nxi−nxj| and |nyi−nyj| (e.g., each of |nx1−nx2| and |ny1−ny2|) is less than about 0.015, or less than about 0.012, or less than about 0.01. In some such embodiments, or in other embodiments, for the at least one wavelength, nzi−nzj (e.g., nz1−nz2, or nz3−nz4, or nz5−nz6) is greater than about 0.04, or greater than about 0.05, or greater than about 0.07, or greater than about 0.08, or greater than about 0.09, or greater than about 0.1. In some such embodiments, or in other embodiments, for the at least one wavelength, each of each of |nxi−nyi| and |nxj−nyj| (e.g., each of |nx1−ny1| and |nx2−ny2|) is less than about 0.02, or less than about 0.015, or less than about 0.012, or less than about 0.01. The difference nzi−nzj for the at least one wavelength may be up to about 0.2, or up to about 0.16, or up to about 0.14, for example.

In some embodiments, for the at least one wavelength in the predetermined wavelength range (and for layers of an RBE compensator, for example), nxi (e.g., nx1, nx3, or nx5) is less than nzi (e.g., nz1, or nz3, or nz5) by at least about 0.02; and/or nxj (e.g., nx2, or nx4, or nx6) is greater than nzj (e.g., nz2, or nz4, or nz6) by at least about 0.02. In some such embodiments, or in other embodiments, for the at least one wavelength in the predetermined wavelength range, nxi is less than nzi by at least about 0.03, or at least about 0.04, or at least about 0.05, or at least about 0.06. In some such embodiments, or in other embodiments, for the at least one wavelength in the predetermined wavelength range, nxj is greater than nzj by at least about 0.025, or at least about 0.03, or at least about 0.04, or at least about 0.05. As described further elsewhere herein, reflectance or other optical properties, may be specified for a p-polarized incident light incident on the multilayer optical film. The p-polarized incident light may be incident in an incident plane comprising the x-direction. In the case of a reflective polarizer, nyi and nzi may be similar (e.g., within about 0.02) and/or nyj and nzj may be similar (e.g., within about 0.02) and/or |nyj−nyi| may be less than about 0.02, for the at least one wavelength. In the case of an optical mirror, each of |nxi−nyi| and |nxj−nyj| may be less than about 0.03, or less than about 0.02, or less than about 0.015, or less than about 0.012, or less than about 0.01, for example, for the at least one wavelength. In some embodiments, for the at least one wavelength in the predetermined wavelength range, nyi (e.g., ny1, ny3, or ny5) is less than nzi (e.g., nz1, nz3, or nz5) by at least about 0.02, and nyj (e.g., ny2, ny4, or ny6) is greater than nzj (e.g., nz2, nz4, or nz6) by at least about 0.02. In some such embodiments, or in other embodiments, for the at least one wavelength, nyi is less than nzi by at least about 0.03, or at least about 0.04, or at least about 0.05, or at least about 0.06. In some such embodiments, or in other embodiments, for the at least one wavelength, nyj is greater than nzj by at least about 0.025, or at least about 0.03, or at least about 0.04, or at least about 0.05. In some embodiments, nxi and/or nyi may be less than nzi by as much as about 0.2, or as much as about 0.15, or as much as about 0.12, or as much as about 0.1, or as much as about 0.08, for example, for the at least one wavelength. In some embodiments, nyj may be greater than nzj by up to about 0.2, or up to about 0.15, or up to about 0.12, or up to about 0.1, or up to about 0.08, for example, for the at least one wavelength.

Suitable materials for the $i^{th}$ (e.g., first, third, or fifth) optical layers (e.g., of an RBE compensator) include sPS, for example. Suitable materials for the $j^{th}$ (e.g., second, fourth, or sixth) optical layers (e.g., of an RBE compensator) include copolyesters such as those available under the TRITAN trade name from Eastman Chemical Company, for example. For example, the $i^{th}$ optical layers may be sPS layers having refractive indices of about 1.55, 1.55, and 1.49 in the x-, y-, and z-directions, respectively, at a wavelength of 633 nm while the $j^{th}$ optical layers may be TRITAN copolyester layers having refractive indices of 1.561, 1.561, and 1.529 in the x-, y-, and z-directions, respectively, at a wavelength of 633 nm. In some embodiments, the $i^{th}$ optical layers are negatively birefringent and the $j^{th}$ optical layers are positively birefringent. PEN, PET, and TRITAN copolyesters are examples of positively birefringent thermoplastic polymers, while sPS is an example of a negatively birefringent thermoplastic polymer. As described in U.S. Pat. No. 9,069,136 (Weber et al.), for example, whether a polymer will exhibit positive or negative birefringence can depend on the geometry of crystallites formed when the polymer is oriented. Suitable positively birefringent thermoplastic polymers include those forming crystallites having a symmetry axis substantially aligned with a stretch direction, while suitable negatively birefringent thermoplastic polymers include those forming crystallites having discotic unit cell structure with the smallest unit cell dimension substantially aligned with a stretch direction. Further examples of positively and negatively birefringent thermoplastic polymers and of isotropic thermoplastic polymers, are described in U.S. Pat. No. 8,854,730 (Wang et al.); and U.S. Pat. No. 9,069,136 (Weber et al.), for example.

In some embodiments, the multilayer optical film 100 includes a first reflector (e.g., one of the pluralities 10, 20, 30 of layers) including alternating higher and lower refractive index optical layers. These optical layers can be formed from any suitable polymeric materials conventionally used in reflective polymeric multilayer optical films. Suitable exemplary materials are described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example. The higher refractive index layers may be positively birefringent layers such as PET or PEN layers, for example, and the lower refractive index layers may be substantially isotropic layers such as PMMA or coPMMA layers, for example. In some cases, the lower index layers may be labeled as $i^{th}$ layers (e.g., first or third optical layers) and the higher index layers maybe labeled as $j^{th}$ layers (e.g., second or fourth optical layers). In some embodiments, for the at least one wavelength in the predetermined wavelength range, a magnitude of a maximum difference between nxi, nyi and nzi is less than about 0.015, or less than about 0.012, or less than about 0.01. In some embodiments, for the at least one wavelength in the visible wavelength range, each of nxj and nyj is greater than nzj by at least about 0.02, or at least about 0.03, or at least about 0.04, or at least about 0.05, or at least about 0.06, or at least about 0.08, or at least about 0.1, or at least about 0.12, or at least about 0.15. Each of nxj and nyj is greater than nzj by up to about 0.3, or up to about 0.25, or up to about 0.2, for example, for the at least one wavelength in the predetermined wavelength range.

In some embodiments, a multilayer optical film 100 includes a plurality of alternating first and second polymeric layers disposed on, and integrally formed with, a plurality of alternating third and fourth polymeric layers and a plurality of alternating fifth and sixth polymeric layers. Any one of the three pluralities (e.g., one of the pluralities 10, 20, 30) may be disposed between the other two of the three pluralities. Each of the three pluralities can include at least 20 polymeric layers in total, or the total number in each plurality can be in a range described elsewhere herein. Each of the first through sixth polymeric layers has an average thickness of less than about 500 nm, or the average thickness can be in a range described elsewhere herein for optical layers. The first through sixth polymeric layers have respective indices nx1 through nx6 along a same in-plane (xy-plane) x-direction, respective indices ny1 through ny6 along an in-plane y-direction orthogonal to the x-direction, and respective indices nz1 through nz6 along a thickness direction (z-direction) of the polymeric layers orthogonal to the x- and y-directions, such that for at least one wavelength in a visible wavelength range extending from about 420 nm to about 680 nm, each of nx1 and ny1 is greater than nz1 by at least 0.02; a magnitude of a maximum difference between nx3, ny3 and nz3 is less than 0.02; and each of nx5 and ny5 is less than nz5 by at least 0.02. In some embodiments, for the at least one wavelength, a maximum difference between nx2, ny2 and nz2 is less than 0.02; each of nx4 and ny4 is greater than nz4 by at least 0.02; each of |nx5−nx6| and |ny5−ny6| is less than 0.02; and nz5−nz6 is greater than 0.02. In some embodiments, for the at least one wavelength, each of nx1 and ny1 is greater than nz1 by at least about 0.03; a maximum difference between nx2, ny2 and nz2 is less than about 0.02; each of nx4 and ny4 is greater than nz4 by at least about 0.03; each of |nx5−nx6| and |ny5−ny6| is less than about 0.02; each of nx5 and ny5 is less than nz5 by at least about 0.03; and nz5−nz6 is greater than about 0.03. The at least one wavelength may include one or more wavelengths in a range from about 450 nm to about 650 nm, or from about 532 nm to about 633 nm, for example, and may include wavelength(s) described elsewhere herein for specifying refractive indices (e.g., about 633 nm).

The first and second layers may be as described for the respective first and second optical layers of an LBE compensator, for example. In some embodiments, for the at least one wavelength, each of nx1 and ny1 is greater than nz1 by at least about 0.02, or by at least about 0.025, or by an amount in a range described elsewhere herein. In some embodiments, for the at least one wavelength in the visible range, a magnitude of a maximum difference between nx2, ny2 and nz2 is less than about 0.02, or is less than about 0.015, or is in a range described elsewhere herein. In some such embodiments, or in other embodiments, for the at least one wavelength in the visible wavelength range, each of nx2 and ny2 is greater than each of nx1 and ny1 by at least about 0.02, or by at least about 0.025, or by an amount in a range described elsewhere herein. In some such embodiments, or in other embodiments, for the at least one wavelength in the visible wavelength range, nz2−nz1≥nx2−nx1≥0.02, nz2−nz1≥nx2−nx1≥0.025, or nz2−nz1 and nx2−nx1 can be in a range described elsewhere herein. In some such embodiments, or in other embodiments, for the at least one wavelength in the visible wavelength range, nz2−nz1≥ny2−ny1≥0.02, or nz2−nz1 and ny2−ny1 can be in a range described elsewhere herein.

The third and fourth layers may be as described for the respective lower and higher refractive index optical layers of the first reflector, for example. In some embodiments, for the at least one wavelength in the visible range, a magnitude of a maximum difference between nx3, ny3 and nz3 is less than about 0.02, or less than about 0.015, or the maximum difference can be in a range described elsewhere herein. In some such embodiments, or in other embodiments, for the at least one wavelength in the visible wavelength range, each of nx4 and ny4 is greater than nz4 by at least about 0.02, or at least about 0.03, or at least about 0.04, or at least about 0.05, or at least about 0.06, or by an amount in a range described elsewhere herein.

The fifth and six layers may be as described for the respective first and second optical layers of an RBE compensator, for example. In some embodiments, for the at least one wavelength in the visible wavelength range, nx5 and ny5 is less than nz5 by at least about 0.02, or by at least about 0.025 or by an amount described elsewhere herein. In some such embodiments, or in other embodiments, for the at least one wavelength in the visible wavelength range, each of nx6 and ny6 is greater than nz6 by at least about 0.02, or by at least about 0.025, or by an amount in a range described elsewhere herein. In some such embodiments, or in other embodiments, for the at least one wavelength in the visible wavelength range, each of |nx5−nx6| and |ny5−ny6| is less than about 0.02, or is less than about 0.015, or is in a range described elsewhere herein. In some such embodiments, or in other embodiments, for the at least one wavelength in the visible wavelength range, nz5−nz6 is greater than about 0.02, or greater than about 0.03, or is greater than about 0.05, or is in a range described elsewhere herein.

In some embodiments, the multilayer optical film 100 is an optical mirror. In some embodiments, for each of the first through sixth polymeric layers and for the at least one wavelength in the visible wavelength range, an absolute value of a difference between the refractive index of the layer along the x-direction and the refractive index of the layer along the y-direction is less than about 0.05, or less than about 0.04, or less than about 0.03, or less than about 0.025, or less than about 0.02, or less than about 0.015, or less than about 0.012, or less than about 0.01.

In some embodiments, a multilayer optical film includes a plurality of alternating first and second polymeric layers disposed on, and integrally formed with, a plurality of alternating third and fourth polymeric layers where each of the two pluralities includes at least 10 or at least 20 polymeric layers in total and each of the first through fourth polymeric layers has an average thickness of less than about 500 nm. The first through fourth polymeric layers have respective refractive indices nx1 through nx4 along a same in-plane (xy-plane) x-direction, respective refractive indices ny1 through n4 along an in-plane y-direction orthogonal to the x-direction, and respective refractive indices nz1 through nz4 along a thickness direction (z-direction) of the polymeric layers orthogonal to the x- and y-directions, such that for at least one wavelength (e.g., 633 nm or another wavelength described elsewhere herein for specifying refractive indices) in a predetermined wavelength range (which may be a visible wavelength range extending from about 420 nm to about 680 nm or may be another predetermined wavelength range described elsewhere herein); each of |nx1−nx2| and |ny1−ny2| is less than about 0.02; nz1−nz2 is greater than about 0.03; nx1 is less than nz1 by at least about 0.02; nx4−nx3 is greater than about 0.03; nz4−nz3≥nx4−nx3; and nx3 is less than nz3 by at least about 0.02. The first and second polymeric layers may be as described elsewhere herein for an RBE compensator and the third and fourth layers may be as described elsewhere herein for an LBE compensator. In some embodiments, for the at least one wavelength, each of |nx1−nx2| and |ny1−ny2| is less than about 0.015, or less than about 0.012, or less than about 0.01. In some such embodiments, or in other embodiments, for the at least one wavelength, nz1−nz2 is greater than about 0.05, or greater than about 0.07, or greater than about 0.08, or greater than about 0.09, or greater than about 0.1, and nz1−nz2 may be up to about 0.25 or up to about 0.2, for example. In some such embodiments, or in other embodiments, for the at least one wavelength, nx1 is less than nz1 by at least about 0.03, or at least about 0.04, or about at least about 0.05, or at least about 0.06 and nx1 may be less than nz1 by up to about 0.25 or up to about 0.2, for example. In some such embodiments, or in other embodiments, for the at least one wavelength, nx4−nx3 is greater than about 0.04, or greater than about 0.05, or greater than about 0.06. In some such embodiments, or in other embodiments, for the at least one wavelength, nz4−nz3 may be greater than nx4−nx3, or nz4−nz3 may be greater than nx4−nx3 by at least about 0.02, or at least about 0.03, or at least about 0.04. In some such embodiments, or in other embodiments, for the at least one wavelength, nx3 is greater than nz3 by at least about 0.03, or at least about 0.04, or at least about 0.05 and nx3 may be greater than nz3 by up to about 0.2, or up to about 0.15, for example. In some such embodiments, or in other embodiments, for the at least one wavelength; a magnitude of a maximum difference between nx4, ny4 and nz4 is less than about 0.02, or less than about 0.015, or less than about 0.012, or less than about 0.01, for example (e.g., in the case of an optical mirror); or nx4 is greater than ny4 by at least about 0.02, or at least about 0.03, or at least about 0.04, or at least about 0.05, or at least about 0.06, for example, and nx4 may be greater than ny4 by up to about 0.25, or up to about 0.2, for example (e.g., in the case of a reflective polarizer). In some embodiments where nx4 is greater than ny4 by at least about 0.03, or at least about 0.04, or at least about 0.05, or at least about 0.06, a magnitude of a difference between ny4 and nz4 is less than about 0.025, or less than about 0.02, or less than about 0.015, or less than about 0.01. In some embodiments, for the at least one wavelength, and nz4−nz3 and/or nx4−nx3 may be up to about 0.25, or up to about 0.2, for example.

Figure 4:
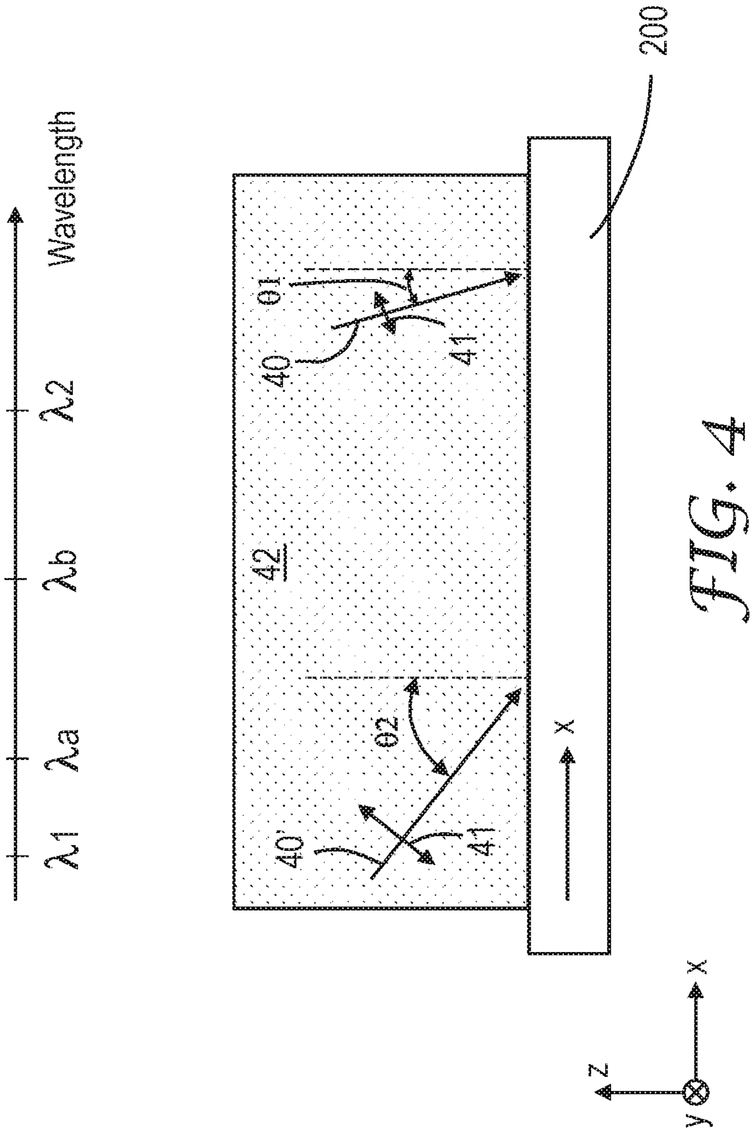
FIG. 4 is a schematic illustration of light incident on an optical element in an incident plane.

FIG. 4 is a schematic illustration of light 40, 40' incident on an optical element 200 in an incident plane 42 (plane defined by direction of the light and the normal to the surface of the optical element). Optical element 200 can correspond to the optical film 100 or to any of the pluralities 10, 20, 30 of layers, for example. Light 40 is incident on the optical element 200 at a first incident angle θ1 and light 40' is incident on the optical element 200 at a second incident angle θ2>θ1. In some embodiments, 0 degrees≤θ1<45 degrees, and θ1+40 degrees≤θ2<85 degrees; or 0 degrees≤θ1<30 degrees, and θ1+45 degrees≤θ2<80 degrees, for example. The first incident angle θ1 can be less than about 40 degrees, or less than about 30 degrees, or less than about 25 degrees, or less than about 20 degrees, or less than about 15 degrees, or less than about 10 degrees, or less than about 5 degrees, or less than about 3 degrees. The first incident angle θ1 can be about 0 degrees (e.g., about 2 degrees or less). The second incident angle θ2 can be greater than the first incident angle θ1 by at least about 30 degrees, or at least about 35 degrees, or at least about 40 degrees, or at least about 45 degrees, or at least about 50 degrees, or at least about 55 degrees, or at least about 60 degrees, or at least about 65 degrees, for example. The second incident angle θ2 can be greater than about 30 degrees, or greater than about 35 degrees, or greater than about 40 degrees, or greater than about 45 degrees, or greater than about 50 degrees, or greater than about 55 degrees, or greater than about 60 degrees, or greater than about 65 degrees, for example. The second incident angle θ2 can be up to 90 degrees, or up to about 85 degrees, or up to about 80 degrees, for example. The second incident angle θ2 can be about 45 degrees, or about 60 degrees, or about 75 degrees, for example. A p-polarization (electric field in the incident plane 42) state 41 is indicated. The incident plane 42 comprises a first in-plane direction (x-direction), which may be along a block axis in the case of a reflective polarizer. When optical reflectance or other properties are described for p-polarized light at first and second incidence angles θ1 and θ2 where θ1 is 0 degrees so that the light at the first incident angle is normally incident, the normally incident light should be understood to be polarized in the same incident plane 42 as the light at the second incident angle θ2.

In some embodiments, an optical reflectance of the optical element 200 is specified for at least a portion of a wavelength range of λ1 to λ2. The wavelength λ1 may be about 150 nm, or about 200 nm, or about 300 nm, or about 350 nm, or about 400 nm, for example. The wavelength λ2 may be about 2500 nm, or about 2200 nm, or about 2000 nm, or about 1800 nm, for example. In some embodiments, an optical reflectance of the optical element 200 is specified for a predetermined wavelength range of λa to λb. The predetermined wavelength range of λa to λb may be at least about 200 nm wide, or at least about 250 nm wide, or at least about 300 nm wide. The predetermined wavelength range of λa to λb may be up to about 2200 nm, or up to about 2000 nm, or up to about 1800 nm, or up to about 1500 nm, or up to about 1200 nm, for example. The predetermined wavelength range of λa to λb may be disposed between the wavelength λ1 and the wavelength λ2 as schematically illustrated in FIG. 4. The predetermined wavelength range may be a wavelength range where the multilayer optical film is configured to have a reflection band. For example, the layer thickness profile of the optical film can be selected to provide reflection over a desired portion of a predetermined wavelength range or transmission over a different desired portion of the predetermined wavelength range. The predetermined wavelength range of λa to λb may be a visible wavelength range, a near infrared wavelength range, or a visible/near infrared wavelength range. The wavelength λa may be about 300 nm, or about 350 nm, or about 380 nm, or about 400 nm, of about 420 nm, or about 450 nm, for example. The wavelength λb may be about 2000 nm, or about 1600 nm, or about 1000 nm, of about 700 nm, or about 680 nm, or about 650 nm, for example. When λb is about 1000 or greater, λa may be about 680 nm, or about 700 nm, or about 720 nm, or about 750 nm, for example. In some embodiments, the wavelength range of λa to λb is a wavelength range of about 380 nm to about 720 nm, or about 400 nm to about 700 nm, or about 420 nm to about 680 nm, or about 450 nm to about 650 nm, for example.

Figure 5A:
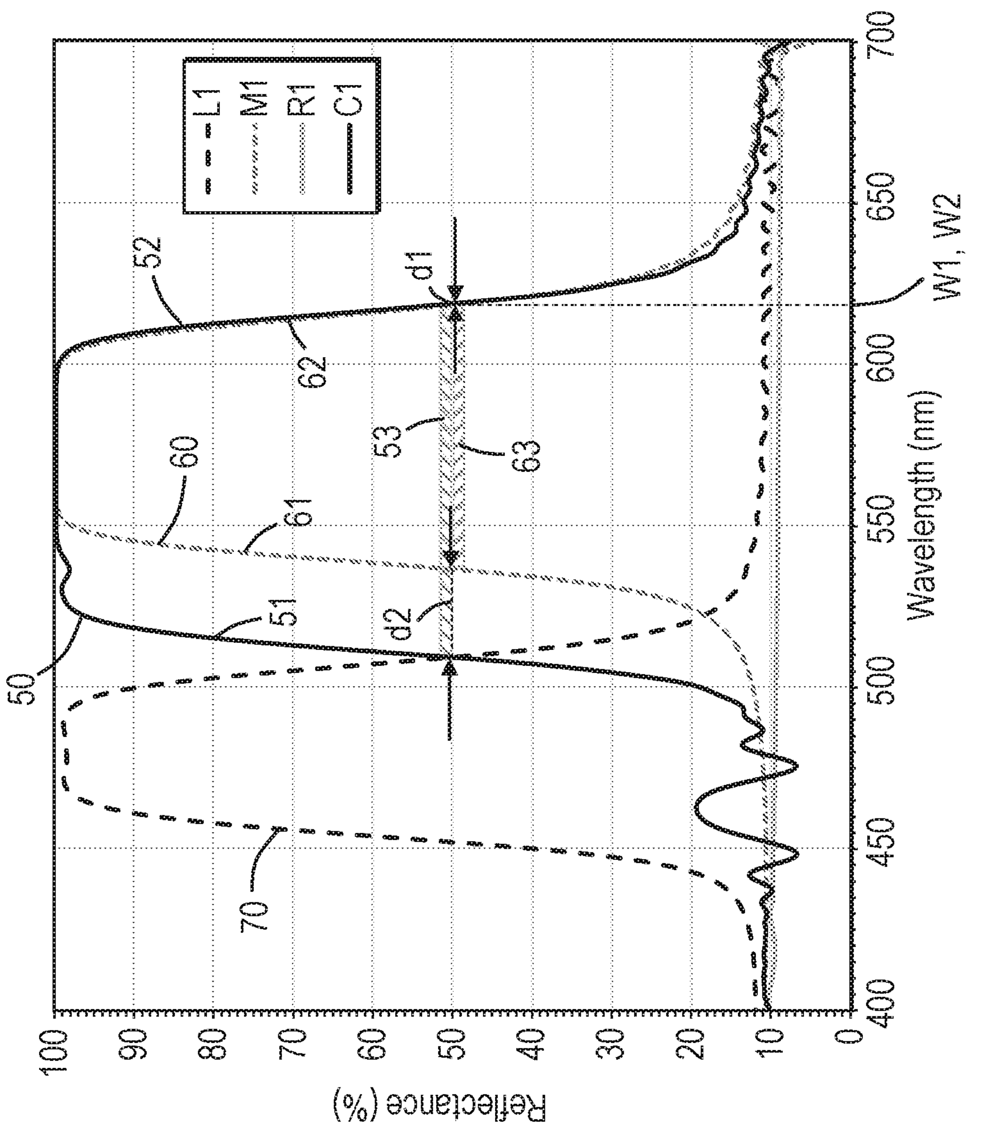
FIGS. 5A-5C are plots of reflectance of a multilayer optical film and of first, second, and third pluralities of polymeric layers of a multilayer optical film for different incident angles, according to some embodiments.
Figure 5B:
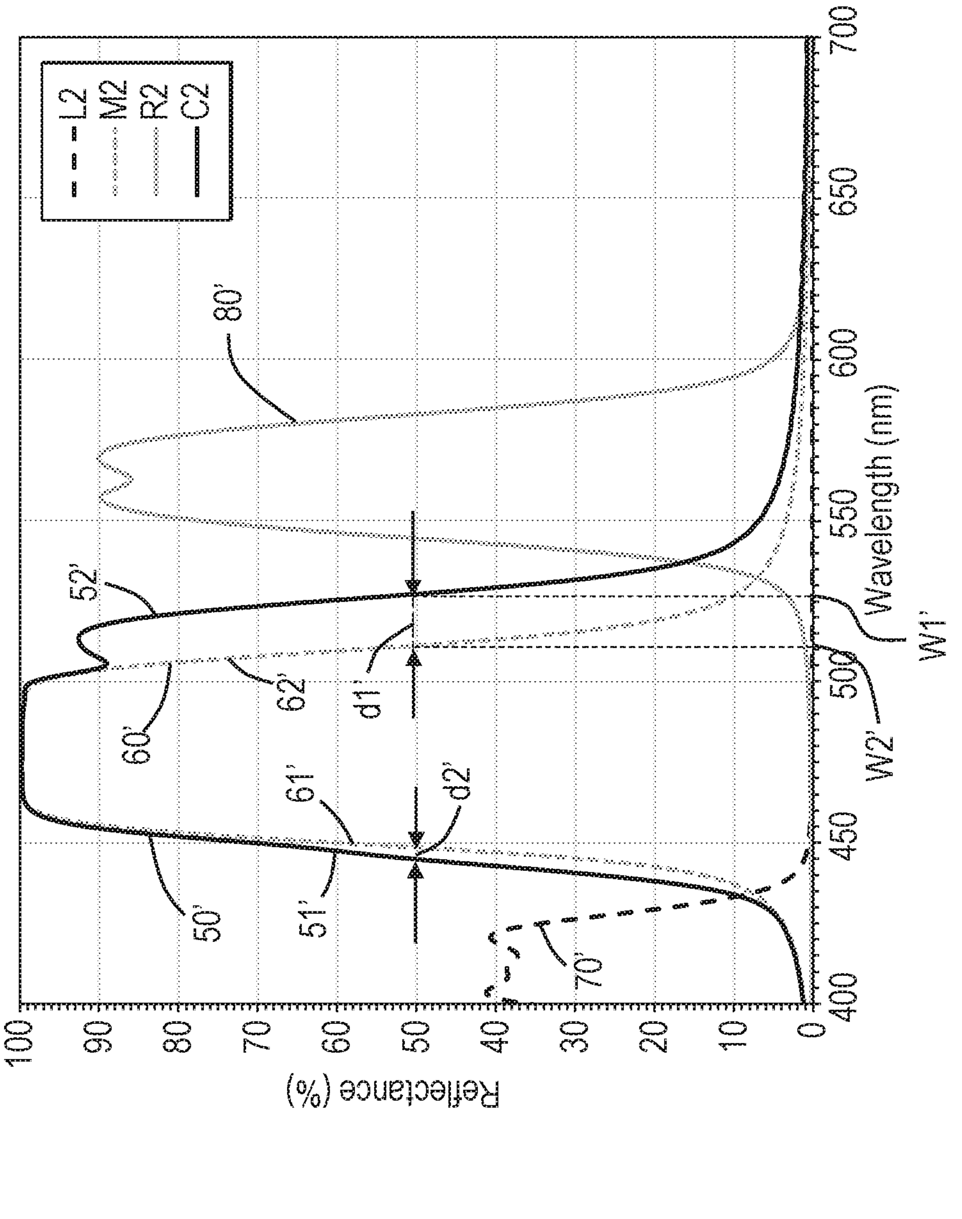
Figure 5C:
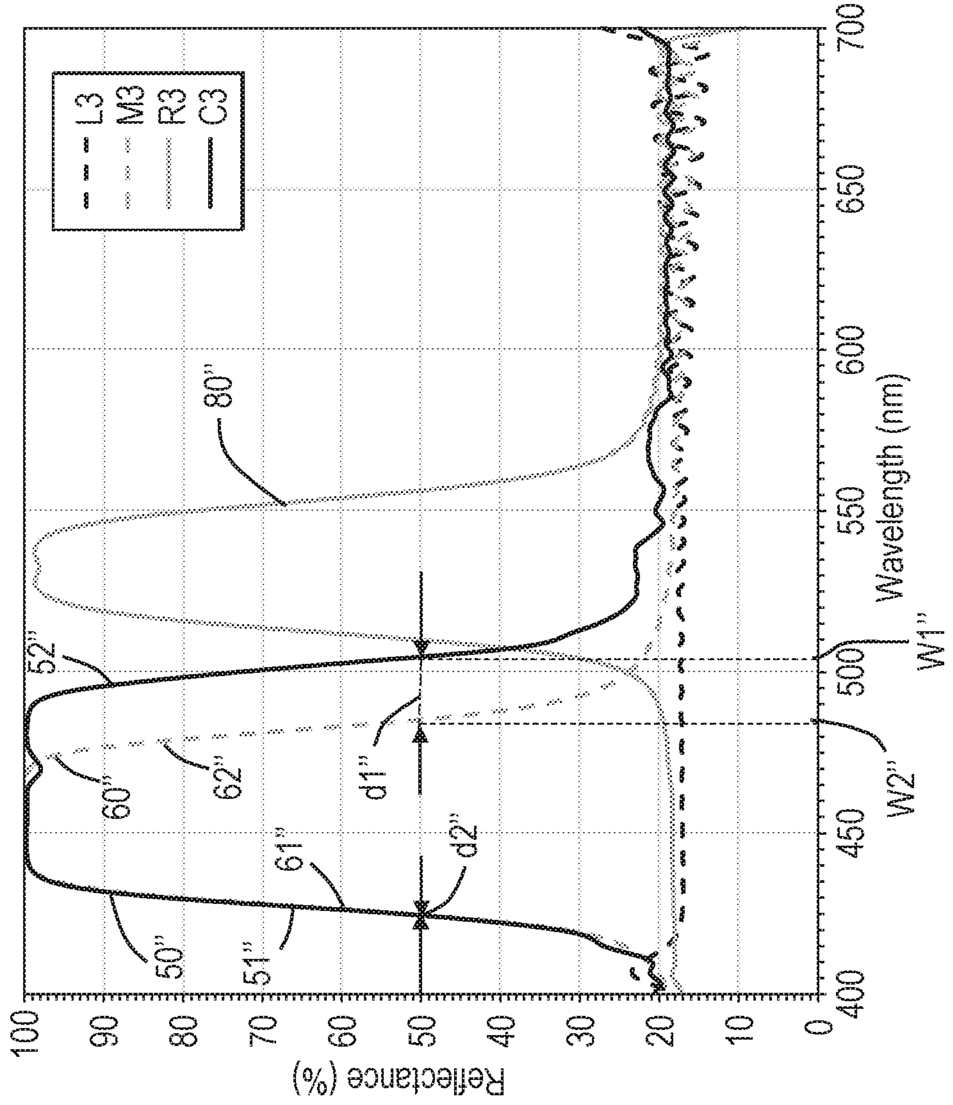

FIG. 5A is a plot of a reflectance C1 of a multilayer optical film and reflectances L1, M1, and R1 of respective first, second, and third pluralities of polymeric layers for p-polarized light at a first incident angle, according to some embodiments. FIG. 5B is a plot of a reflectance C2 of the multilayer optical film and reflectances L2, M2, and R2 of the respective first, second, and third pluralities of polymeric layers for p-polarized light a second incident angle. FIG. 5C is a plot of a reflectance C3 of the multilayer optical film and reflectances L3, M3, and R3 of the respective first, second, and third pluralities of polymeric layers for p-polarized light a third incident angle. The multilayer optical film includes the second plurality of polymeric layers and includes pluralities of optical layers corresponding to the first and third pluralities of polymeric layers, but the reflectance L1 of the first plurality of polymeric layers is shifted to lower wavelengths than that of the corresponding plurality of polymeric layers of the multilayer optical film for case of illustration of the reflection bands 50 and 70 and the reflection bands 50' and 70', and, similarly, the reflectance R2 of the third plurality of polymeric layers is shifted to higher wavelengths than the corresponding plurality of polymeric layers of the multilayer optical film for ease of illustration of the reflection bands 50' and 80' and the reflection bands 50" and 80". In particular, the reflection bands 70 and 70' are shifted to the left for case of illustration and the reflection bands 80' and 80" are shifted to the right for case of illustration.

The plots of FIGS. 5A to 5C were calculated using conventional optical modeling techniques assuming a first reflector having alternating high and low index optical layers where the high index layers had refractive indices of 1.65, 1.65, and 1.49 in the x-, y- and z-directions and the low index layers had isotropic refractive indices of 1.49; an RBE compensator having alternating high and low index optical layers where the high index layers had refractive indices of 1.55, 1.55, and 1.62 in the x-, y- and z-directions and the low index layers had refractive indices of 1.55, 1.55, and 1.49 in the x-, y- and z-directions; and an LBE compensator having alternating high and low index optical layers where the high index layers had isotropic refractive indices of 1.65 and the low index layers had had refractive indices of 1.55, 1.55, and 1.49 in the x-, y- and z-directions, where the refractive indices are specified at 633 nm. The incident angles for FIGS. 5A-5C were 0 degrees, 60 degrees, and 75 degrees, respectively. The spectra were computed at wavelengths in 1 nm steps (i.e., adjacent wavelengths differed by 1 nm) and were smoothed using a moving average that replaces the reflectance at a wavelength with the mean of the reflectances at the wavelength and at its 4 closest neighbor wavelengths. The smoothing procedure was applied 4 times on the same spectrum to produce the final spectrum. This procedure was selected as it has been found to generally provide a good match between computed and measured spectra.

In some embodiments, a multilayer optical film 100 includes a plurality (e.g., one of 10, 20, or 30) of polymeric first layers (e.g., 11, 12; or 21, 22; or 31, 32) numbering at least 10 in total, where each of the first layers has an average thickness of less than about 500 nm. The number of polymeric layers in the plurality of polymeric first layers can be in any of the ranges described elsewhere herein. The average thicknesses of the polymeric first layers can be in any of the ranges described elsewhere herein for optical layers. The multilayer optical film 100 may further include a plurality of polymeric second layers numbering at least 10 in total, where each of the second layers has an average thickness of less than about 500 nm. The plurality of polymeric first layers may be disposed on, and/or may be integrally formed with, the plurality of polymeric second layers. In some embodiments, the multilayer optical film 100 includes at least one layer (e.g., 153, or 154, or 153' and 154) disposed between the plurality of polymeric first layers and the plurality of polymeric second layers that has an average thickness greater than about 1 micrometer or in any range described elsewhere herein for a protective boundary layer. The multilayer optical film 100 may further include a plurality of polymeric third layers numbering at least 10 in total, where each of the third layers has an average thickness of less than about 500 nm. The plurality of polymeric third layers be disposed on, and/or may be integrally formed with, the plurality of polymeric first layers and the plurality of polymeric second layers. In some embodiments, the multilayer optical film 100 includes at least one layer (e.g., 153, or 154, or 153' and 154') disposed between each of the pluralities of polymeric layers that has an average thickness greater than about 1 micrometer or in any range described elsewhere herein for a protective boundary layer. The number of polymeric layers in the plurality of polymeric second layers and/or the number of polymeric layers in the plurality of polymeric third layers can be in any of the ranges described elsewhere herein. The average thicknesses of the polymeric second layers and/or the polymeric third layers can be in any of the ranges described elsewhere herein for optical layers. In a predetermined wavelength range (e.g., λa to λb described elsewhere herein) disposed between about 200 nm and about 2000 nm, for a p-polarized incident light (e.g., light 40, 40' having p-polarization state 41), and for each of a first incident angle θ1 and a second incident angle θ2 (e.g., corresponding to the second incident angle of FIG. 5B or the third incident angle of FIG. 5C) greater than the first incident angle by at least about 40 degrees; an optical reflectance of each of the optical film (e.g., optical reflectance C1, and optical reflectance C2 or C3) and the plurality of polymeric first layers (e.g., optical reflectance M1, and optical reflectance M2 or M3) versus wavelength has a reflection band (e.g., reflection band 50 of the optical reflectance C1, and reflection band 50' or 50" of the respective optical reflectance C2 or C3; and reflection band 60 of the optical reflectance M1, and reflection band 60' or 60" of the respective optical reflectance M2 or M3) having a left band edge (LBE) (e.g., LBE 51 of reflection band 50, and LBE 51' or 51" of respective reflection band 50' or 50"; and LBE 61 of reflection band 60, and LBE 61' or 61" of respective reflection band 60' or 60") at a short wavelength side of the reflection band where the reflectance generally increases with increasing wavelength, and a right band edge (RBE) (e.g., RBE 52 of reflection band 50, and RBE 52 or 52" of respective reflection band 50' or 50"; and RBE 62 of reflection band 60, and RBE 62' or 62" of respective reflection band 60' or 60") at a long wavelength side of the reflection band where the reflectance generally decreases with increasing wavelength, such that a separation d1 between the RBEs of the optical film and the first layers is less than a separation d2 between the LBEs of the optical film and the first layers for the first incident angle, and a separation d1' or d1" between the RBEs of the optical film and the first layers is greater than a separation d2' or d2" between the LBEs of the optical film and the first layers for the second incident angle. In some embodiments, for the p-polarized light and the first incident angle, an optical reflectance versus wavelength of the plurality of polymeric second layers does not have a reflection band in the predetermined wavelength range. In some embodiments, in the predetermined wavelength range and for the p-polarized incident light; for the first incident angle, the optical film has a peak optical reflectance of greater than about 50%, and the plurality of polymeric second layers has a substantially constant optical reflectance having a standard deviation of less than about 3%; and for the second incident angle, the optical film and the plurality of polymeric second layers each has a peak optical reflectance of greater than about 40%. The peak optical reflectances and/or the standard deviation can be in any of the respective ranges described elsewhere herein.

The difference in the second and first incident angles can be in any of the ranges described elsewhere herein. In some embodiments, the separation between the RBEs for the first incident angle is less than about 8 nm, or less than about 6 nm, or less than about 5 nm, or less than about 4 nm, for example. In some such embodiments, or in other embodiments, the separation between the LBEs for the first incident angle is greater than about 10 nm, or greater than about 12 nm, or greater than about 14 nm, or greater than about 16 nm, or greater than about 18 nm, or greater than about 20 nm, for example. In some such embodiments, or in other embodiments, the separation between the RBEs for the second incident angle is greater than about 10 nm, or greater than about 12 nm, or greater than about 14 nm, or greater than about 16 nm, or greater than about 18 nm, or greater than about 20 nm, for example. In some such embodiments, or in other embodiments, the separation between the LBEs for the second incident angle is less than about 8 nm, or less than about 6 nm, or less than about 5 nm, or less than about 4 nm, for example. The separation between the LBEs for the first incident angle may be up to about 100 nm, or up to about 50 nm, for example. The separation between the RBEs for the second incident angle may be up to about 100 nm, or up to about 50 nm, for example.

The plurality of polymeric first layers may be as described elsewhere herein for a first or primary reflector. The optical film may further include one or both of an LBE compensator or a RBE compensator of the present description. For example, the optical film may include a plurality of polymeric second layers numbering at least 10 in total (or in a range described elsewhere herein) where each of the second layers has an average thickness of less than about 500 nm (or the average thickness can be in a range described elsewhere herein) and where the plurality of polymeric second layers can be or include a plurality of alternating first and second optical layers. The first and second optical layers can be as described elsewhere herein for an LBE compensator or an RBE compensator. In some embodiments, the first and second optical layers are as described elsewhere herein for an LBE compensator and the multilayer optical film 100 further includes a plurality of polymeric third layers numbering at least 10 in total (or in a range described elsewhere herein) where each of the third layers has an average thickness of less than about 500 nm (or in a range described elsewhere herein) and where the plurality of polymeric third layers can be or include a plurality of alternating third and fourth optical layers that can be as described elsewhere herein for an RBE compensator.

In some embodiments, the plurality of polymeric first layers may be as described elsewhere herein for a first or primary reflector. For example, the plurality of polymeric first layers may include an optical mirror (e.g., for substantially normally incident light and for at least one wavelength in the predetermined wavelength range, the optical mirror can have an optical reflectance of greater than about 60% or greater than about 70% for each of two mutually orthogonal polarization states) or a reflective polarizer (e.g., for substantially normally incident light and for at least one wavelength in the predetermined wavelength range, the reflective polarizer can have an optical reflectance of greater than about 60% or greater than about 70% for light having a first polarization state (e.g., polarized along the x-axis) and an optical transmittance of greater than about 60% or greater than about 70% for light having an orthogonal second polarization state (e.g., polarized along the y-axis)). In some such embodiments, or in other embodiments, the multilayer optical film 100 further includes a plurality of polymeric second layers. In some embodiments, the plurality of polymeric second layers includes a plurality of alternating first and second optical layers (e.g., the plurality of polymeric second layers can include a right band edge compensator including the plurality of alternating first and second optical layers) having respective refractive indices nx1 and nx2 along a same in-plane x-direction, respective refractive indices ny1 and ny2 along an in-plane y-direction orthogonal to the x-direction, and respective refractive indices nz1 and nz2 along a thickness direction of the polymeric second layers orthogonal to the x- and y-directions, where for at least one wavelength in the predetermined wavelength range; each of |nx1−nx2| and |ny1−ny2| is less than about 0.02; and nz1−nz2 is greater than about 0.03. In some such embodiments, the multilayer optical film further includes a plurality of polymeric third layers numbering at least 10 in total where each of the third layers has an average thickness of less than about 500 nm and where the plurality of polymeric third layers includes a plurality of alternating third and fourth optical layers (e.g., the plurality of polymeric third layers can include a left band edge compensator including the plurality of alternating third and fourth optical layers) having respective refractive indices nx3 and nx4 along the x-direction, respective refractive indices ny3 and ny4 along the y-direction, and respective refractive indices nz3 and nz4 along the thickness direction, where the p-polarized incident light can be incident on the multilayer optical film in an incident plane comprising the x-direction, and where for the at least one wavelength in the predetermined wavelength range, nz4−nz3≥nx4−nx3≥0.02. Alternatively, the plurality of polymeric second layers can include the alternating third and fourth optical layers (e.g., the plurality of polymeric second layers can include a left band edge compensator including the plurality of alternating third and fourth optical layers). In some embodiments, the plurality of polymeric second layers includes a plurality of alternating first and second optical layers (e.g., the plurality of polymeric second layers can include a left band edge compensator including the plurality of alternating first and second optical layers) having respective refractive indices nx1 and nx2 along a same in-plane x-direction, respective refractive indices ny1 and ny2 along an in-plane y-direction orthogonal to the x-direction, and respective refractive indices nz1 and nz2 along a thickness direction of the polymeric second layers orthogonal to the x- and y-directions, where for at least one wavelength in the predetermined wavelength range, nz2−nz1≥nx2−nx1≥0.02. The differences in refractive indices can be in any corresponding range described elsewhere herein for the corresponding LBE or RBE compensator.

In some embodiments, the plurality of polymeric first layers defines a primary reflector and the plurality of polymeric second layers defines at least one of a right band edge compensator or a left band edge compensator. In some embodiments, each of the plurality of polymeric first layers and the plurality of polymeric second layers includes a plurality of alternating first and second optical layers. In some embodiments, the multilayer optical film includes a right band edge compensator including the plurality of alternating first and second optical layers of the plurality of polymeric second layers. In some such embodiments, or in other embodiments, the plurality of polymeric first layers defines a primary reflector (e.g., an optical mirror or a reflective polarizer) such for the first incident angle, the reflection band for each of the optical film and the plurality of polymeric first layers comprises a full width at half maximum (FWHM), each of the two FWHMs overlapping greater than 50% (or in a range described elsewhere herein) of the other of the two FWHMs. In some such embodiments, or in other embodiments, the multilayer optical film further includes a plurality of polymeric third layers including a plurality of alternating first and second optical layers. In some such embodiments, the multilayer optical film includes a left band edge compensator includes the plurality of alternating first and second optical layers of the plurality of polymeric third layers. In some embodiments, the multilayer optical film includes a left band edge compensator including the plurality of alternating first and second optical layers of the plurality of polymeric second layers. The left and right band edge compensators can be as described elsewhere herein.

In some embodiments, a multilayer optical film 100 includes a plurality (e.g., one of 10, 20, or 30) of polymeric first layers disposed on, and integrally formed with, a plurality (e.g., a different one of 10, 20, 30) of polymeric second layers, where each of the two pluralities including at least 10 polymeric layers in total (or the total number in each plurality can be in a range described elsewhere herein) and each of the first and second layers has an average thickness of less than about 500 nm (or the average thickness can be in a range described elsewhere herein for optical layers). In some embodiments, for a p-polarized incident light (40, 40') in a predetermined wavelength range (e.g., Na to λb) that is at least about 200 nm wide and is disposed between about 200 nm and about 2000 nm; for a first incident angle θ1, an optical reflectance of the plurality of polymeric first layers (optical reflectance M1), but not the plurality of polymeric second layers (optical reflectance R1), versus wavelength has a reflection band 60; and for a second incident angle θ2 (e.g., corresponding to the second incident angle of FIG. 5B or the third incident angle of FIG. 5C) greater than the first incident angle by at least about 40 degrees (or the first and second incident angles can be in any of the ranges described elsewhere herein), an optical reflectance of each of the pluralities of polymeric first layers (optical reflectance M2 or M3) and the plurality of polymeric second layers (optical reflectance R2 or R3) versus wavelength has a reflection band (60' and 80'; or 60" and 80"). A reflection band generally refers to a single confined region of increased reflectivity on a plot of reflectivity versus wavelength, where the reflectivity achieves a value of at least 20% within the region and where the reflectivity is less than about 0.6 times the maximum reflectivity in the region in adjacent wavelength ranges on each side of the region.

The plurality of polymeric first layers can be as described elsewhere herein for a first or primary reflector. The plurality of polymeric second layers can be as described elsewhere herein for an RBE compensator. The multilayer optical film 100 may further include a plurality (e.g., the remaining one of 10, 20, or 30) of polymeric third layers disposed on, and integrally formed with, the pluralities of polymeric first and second layers. The plurality of polymeric third layers can be as described elsewhere herein for an LBE compensator. For example, the plurality of polymeric second layers can be or include a plurality of alternating first and second optical layers that can be as described for an RBE compensator and the plurality of polymeric third layers, when included in the optical film, can be or include a plurality of alternating third and fourth optical layers that can be as described for an LBE compensator.

Figure 6:
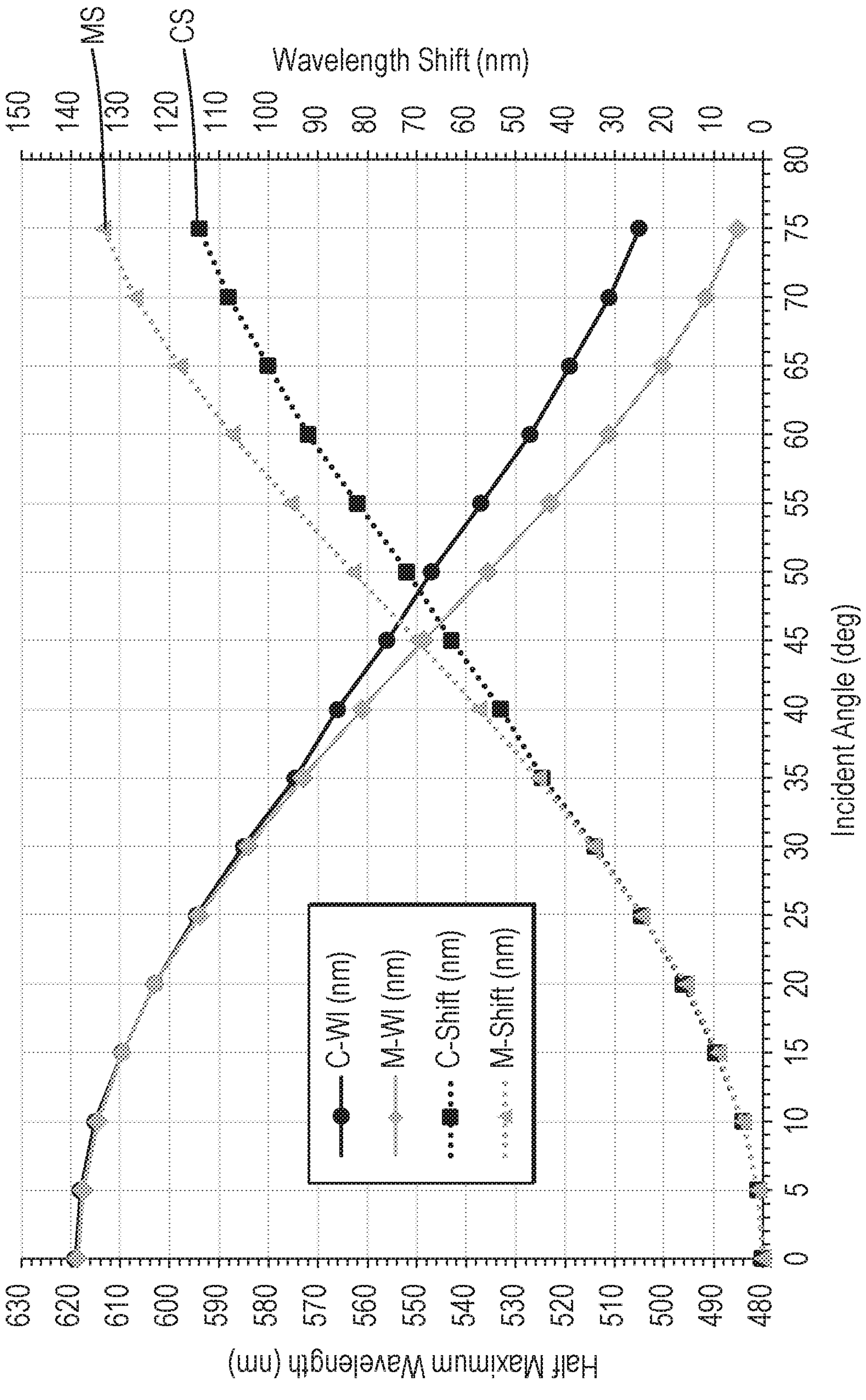
FIG. 6 is a plot of wavelengths at half maximum reflectances along the right band edges of an optical film and first layers of the optical film and the shifts in the wavelengths at the half maximum reflectances with incident angle, according to some embodiments.

In some embodiments, a multilayer optical film 100 includes a plurality (e.g., one of 10, 20, or 30) of polymeric first layers (e.g., 11, 12; or 21, 22; or 31, 32) numbering at least 10 in total (or the total number can be in any range described elsewhere herein), where each of the first layers has an average thickness of less than about 500 nm (or the average thickness can be in any range described elsewhere herein for optical layers), such that in a predetermined wavelength range (e.g., λa to λb) disposed between about 200 nm and about 2000 nm, and for a substantially normally incident (e.g., within 20 degrees, or within 10 degrees, or within 5 degrees of normally incident) p-polarized incident light (40, 40'), an optical reflectance of each of the optical film (e.g., optical reflectance C1) and the plurality of polymeric first layers (e.g., optical reflectance M1) versus wavelength has a reflection band 50 and 60 having a full width at half maximum (FWHM) 53 and 63 and a right band edge (RBE) 52 and 62 at a long wavelength side of the reflection band where the reflectance generally decreases with increasing wavelength, such that at least one of the two FWHMs overlaps at least 50% or at least about 60% or at least about 70% or at least about 75% of the other one of the two FWHMs (sec, e.g., FIG. 5A), and when an incident angle of the p-polarized incident light increases by at least about 60 degrees, wavelengths at the half maximum reflectances along the RBEs of the optical film and the first layers shift to smaller wavelengths (e.g., W1, W2 shifts to W1', W2' or to W1", W2") by CS and MS, respectively, where CS is less than MS by at least about 10 nm. In some embodiments, each of the two FWHMs overlaps at least 50% or at least about 60% or at least about 70% or at least about 75% of the other one of the two FWHMs (sec, e.g., FIG. 5A). In some embodiments, CS is less than MS by at least about 12 nm, or at least about 14 nm, or at least about 16 nm, or at least about 18 nm, for example. In some embodiments, CS is less than MS by up to about 40 nm, or up to about 35 nm, or up to about 30 nm, for example. FIG. 6 is a plot of wavelengths at the half maximum reflectances along the RBEs of an optical film (wavelengths C-Wl) and the first layers (wavelengths M-Wl) of the optical film and the shifts in the wavelengths at the half maximum reflectances along the RBEs of the optical film (C-Shift) and the first layers (M-Shift) with incident angle, according to some embodiments. FIG. 6 was calculated using the same model as that of FIGS. 5A-5C.

The plurality of polymeric first layers may be as described elsewhere herein for a first or primary reflector. In some embodiments, the optical film includes an RBE compensator described elsewhere herein to reduce CS relative to MS. For example, the multilayer optical film 100 can include a plurality of polymeric second layers that can be or include a plurality of alternating first and second optical layers which can be as described elsewhere herein for an RBE compensator. The optical film may optionally also include an LBE compensator as described elsewhere herein. For example, the multilayer optical film 100 can include a plurality of polymeric third layers that can be or include a plurality of alternating third and fourth optical layers which can be as described elsewhere herein for an LBE compensator.

Figure 7A:
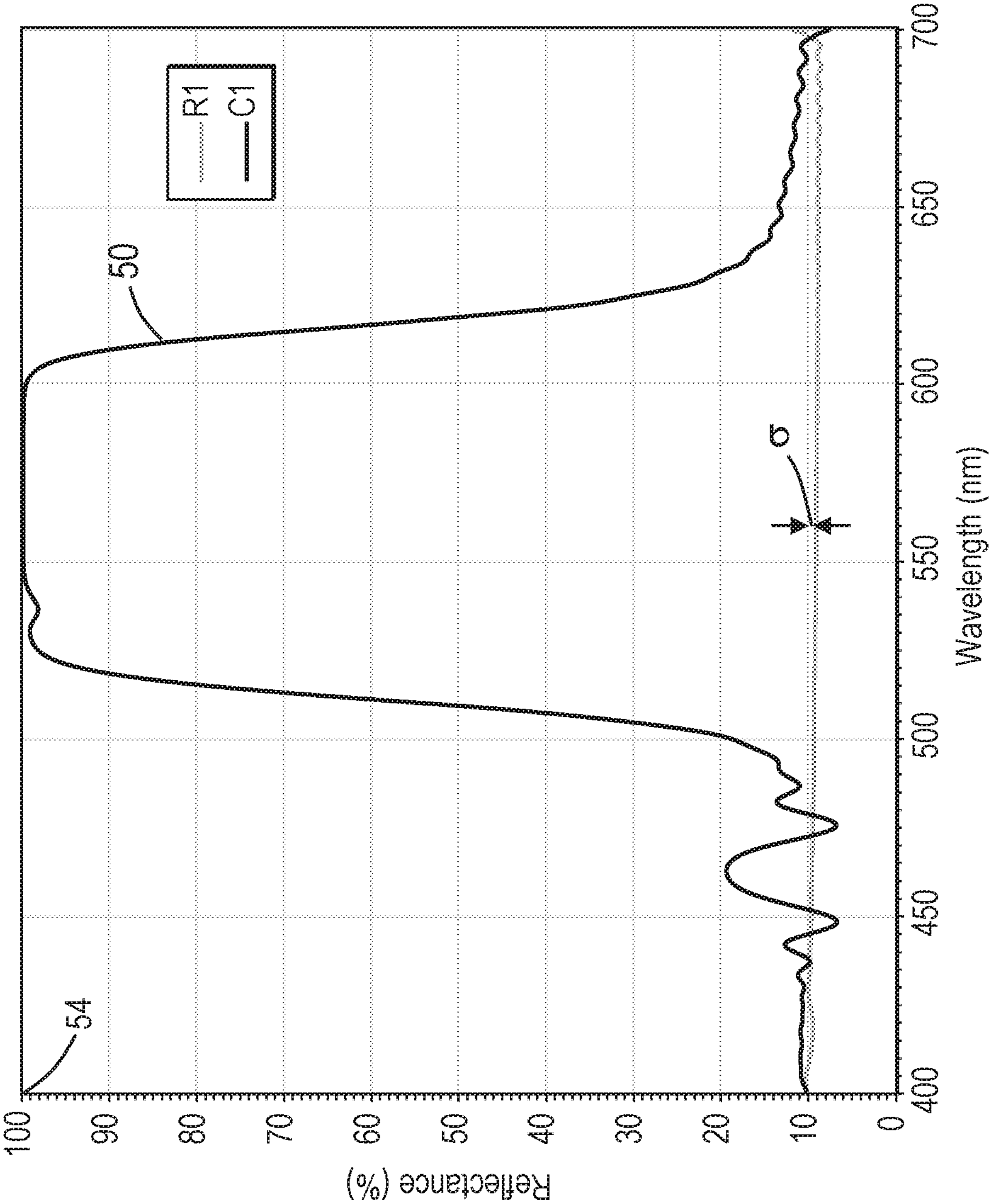
FIGS. 7A-7B are plots of the reflectances of FIGS. 5A-5B illustrating peak reflectances and the standard deviation σ of a reflectance.
Figure 7B:
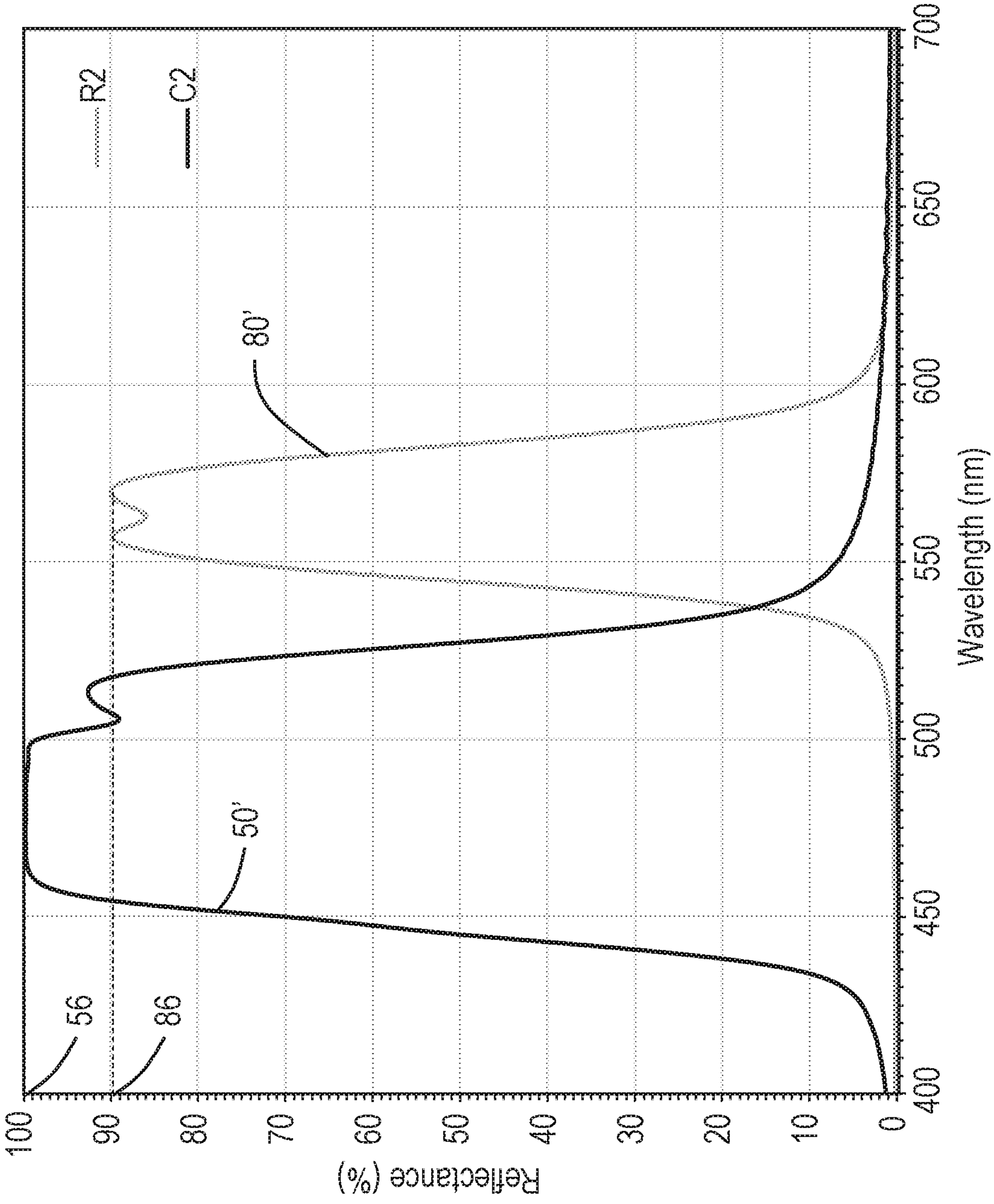

FIGS. 7A-7B are plots of the reflectances R1, C1, R2 and C2 of FIGS. 5A-5B illustrating peak reflectances of the reflection bands 50, 50' and 80' and the standard deviation σ of the reflectance R1.

In some embodiments, a multilayer optical film 100 includes a plurality (e.g., one of 10, 20, or 30) of polymeric first layers (e.g., 11, 12; or 21, 22; or 31, 32) numbering at least 10 in total (or the total number can be in any range described elsewhere herein) where each of the first layers has an average thickness of less than about 500 nm (or the average thickness can be in any range described elsewhere herein for optical layers), such that in a predetermined wavelength range (e.g., λa to λb) that is at least about 200 nm wide, and for a p-polarized incident light 40, 40; for a first incident angle θ1, an optical reflectance of the optical film (optical reflectance C1) includes a first reflection band 50 having a peak reflectance 54 of greater than about 50%, and the plurality of polymeric first layers has a substantially constant (e.g., a maximum difference in reflectance in the predetermined wavelength range of less than about 10% or less than about 5%) optical reflectance (optical reflectance R1) having a standard deviation σ of less than about 3%; and for a second incident angle θ2 greater than the first incident angle θ1 by at least about 40 degrees (or the first and second incident angles can be in any range described elsewhere herein), the optical film and the plurality of polymeric layers have respective second and third reflection bands 50' and 80", each having a peak reflectance (56, 86, respectively) greater than about 40%. The multilayer optical film 100 may further include a plurality of polymeric second layers numbering at least 10 in total, where each of the second layers has an average thickness of less than about 500 nm. The multilayer optical film 100 may further include a plurality of polymeric third layers numbering at least 10 in total, where each of the third layers has an average thickness of less than about 500 nm. The number of polymeric layers in the plurality of polymeric second layers and/or the number of polymeric layers in the plurality of polymeric third layers can be in any of the ranges described elsewhere herein. The average thicknesses of the polymeric second layers and/or the polymeric third layers can be in any of the ranges described elsewhere herein for optical layers. In the wavelength range of 420 nm to 680 nm, the optical reflectance R1 illustrated in FIG. 7A has an average of 9.2% and a standard deviation σ of 0.31% (o is expressed as a percent since it is a standard deviation of a reflectance that is expressed as a percent). For each of the first, second and third reflection bands, the reflection band can be disposed in the predetermined wavelength range such that the reflection band includes a left band edge disposed in the predetermined wavelength range at a short wavelength side of the reflection band where the reflectance generally increases with increasing wavelength, and a right band edge disposed in the predetermined wavelength range at a long wavelength side of the reflection band where the reflectance generally decreases with increasing wavelength.

For measured reflection spectra, the standard deviation of the optical reflectance can be calculated directly from measured reflectance values. In the case of a calculated optical reflectance, the optical reflectance can be smoothed as described elsewhere herein before calculating the standard deviation as this has been found to provide closer agreement with experimental results. In some embodiments, the standard deviation σ is less than about 2%, or less than about 1%, or less than about 0.8%, or less than about 0.6%, or less than about 0.5%, or less than about 0.4%. The standard deviation σ may be as low as about 0.2%, or as low as about 0.1%, or as low as about 0.05%, or as low as about 0.03%, for example. In some embodiments, the peak reflectance 54 is greater than about 65%, or greater than about 80%, or greater than about 90%, or greater than about 95%. In some such embodiments, or in other embodiments, each of the peak reflectances 56 and 86 is greater than about 50%, or greater than about 60%, or greater than about 70%, or greater than about 80%. In some such embodiments, or in other embodiments, the peak reflectance 56 is greater than about 90%, or greater than about 95%.

The plurality of polymeric first layers may be as described elsewhere herein for an RBE compensator. For example, the plurality of polymeric first layers that can be or include a plurality of alternating first and second optical layers which can be as described elsewhere herein for an RBE compensator. The multilayer optical film 100 can include a first reflector as described elsewhere herein. The multilayer optical film 100 may optionally also include an LBE compensator as described elsewhere herein. For example, the multilayer optical film 100 can include a plurality of polymeric second layers that can be or include a plurality of alternating third and fourth optical layers which can be as described elsewhere herein for an LBE compensator.

Figure 8A:
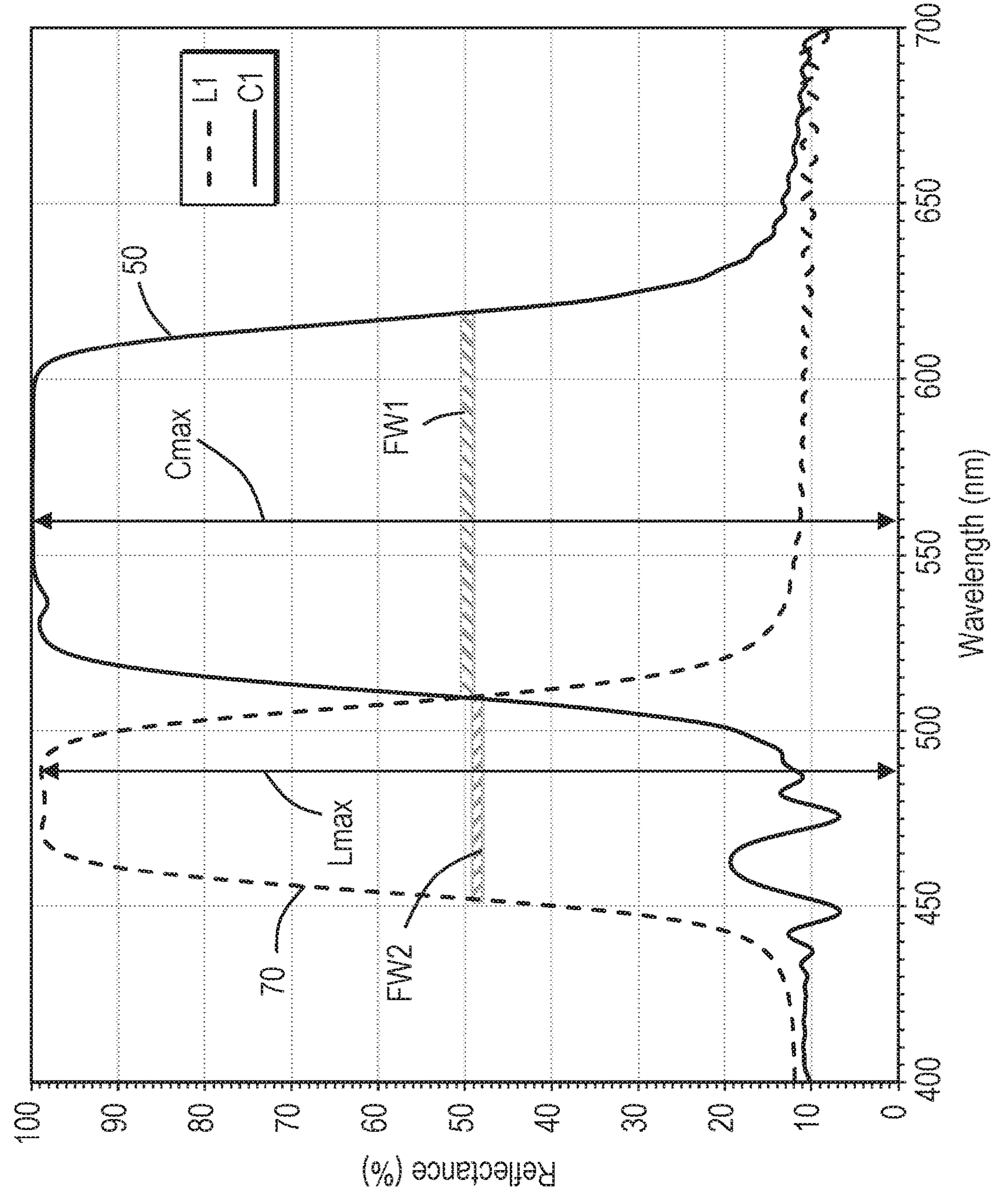
FIGS. 8A-8B are plots of the reflectances of FIGS. 5A-5B illustrating maximum reflectances and full widths at half maxima at different incident angles.
Figure 8B:
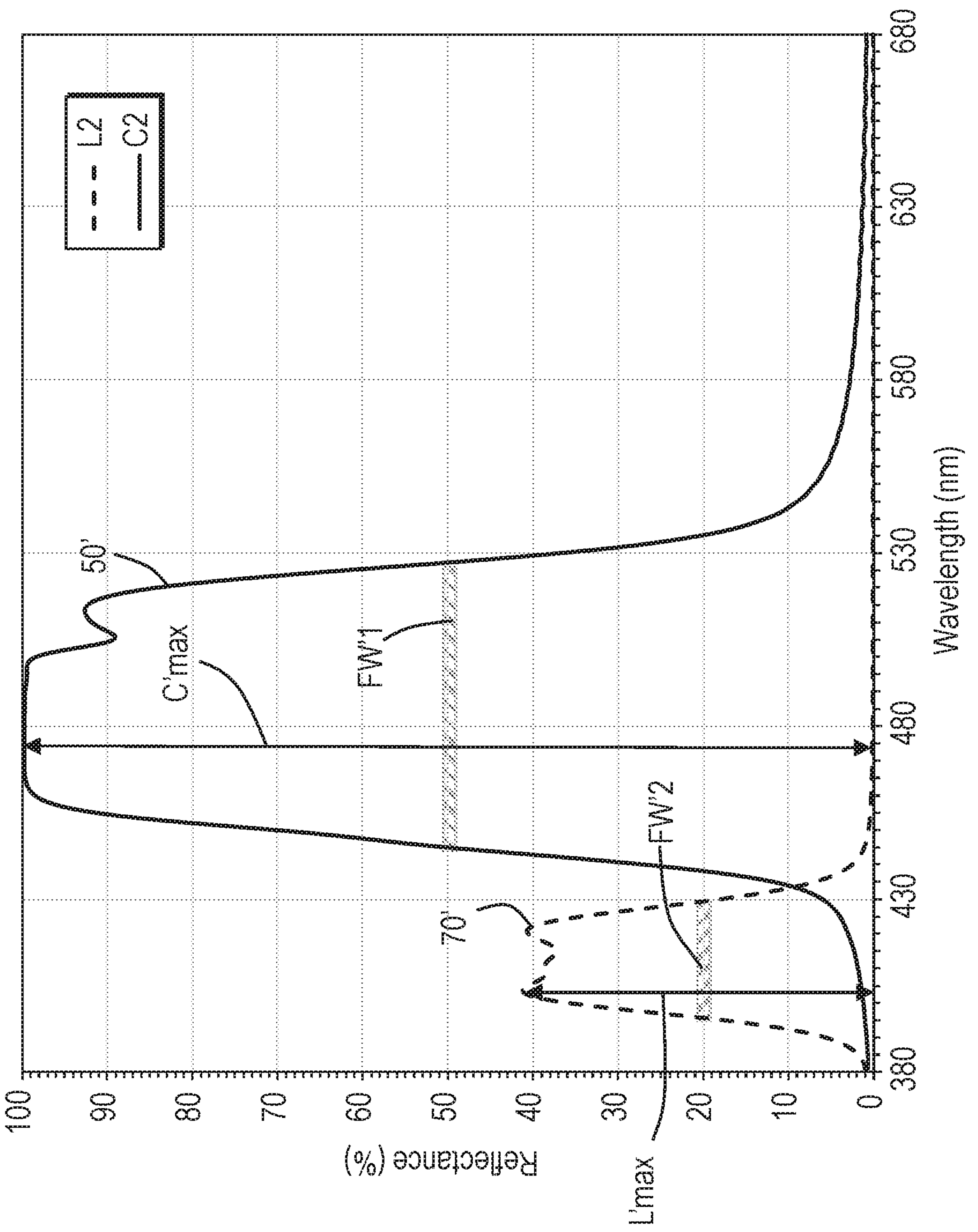

FIGS. 8A-8B are plots of the reflectances L1, C1, L2 and C2 of FIGS. 5A-5B illustrating maximum reflectances and full widths at half maxima at different incident angles.

In some embodiments, a multilayer optical film 100 includes a plurality (e.g., one of 10, 20, or 30) of polymeric first layers (e.g., 11, 12; or 21, 22; or 31, 32) numbering at least 10 in total (or the total number can be in any range described elsewhere herein) where each of the first layers has an average thickness of less than about 500 nm (or the average thickness can be in any range described elsewhere herein for optical layers). The plurality of polymeric first layers may be as described elsewhere herein for an LBE compensator. For example, the plurality of polymeric first layers can be or include a plurality of alternating first and second optical layers which can be as described elsewhere herein for an LBE compensator. The multilayer optical film 100 can include a first reflector as described elsewhere herein. The multilayer optical film 100 may optionally also include an RBE compensator as described elsewhere herein. For example, the multilayer optical film 100 can include a plurality of polymeric second layers that can be or include a plurality of alternating third and fourth optical layers which can be as described elsewhere herein for an RBE compensator.

In some embodiments, in a predetermined wavelength range (e.g., λa to λb) disposed between about 200 nm and about 2000 nm, and for a p-polarized incident light 40, 40', maximum reflectances of the optical film and the plurality of polymeric first layers are respectively Cmax and Lmax for a first incident angle θ1 and C'max and L'max for a second incident angle θ2 greater than the first incident angle θ1 by at least about 40 degrees, where Cmax and Lmax are within 20% of each other (|Cmax−Lmax|<20%), and C'max≥2 L'max. In some embodiments, Cmax and Lmax are within 15% of each other, or within 10% of each other, or within 5% of each other. In some embodiments, C'max≥2.1 L'max, or C'max≥2.2 L'max, or C'max≥2.3 L'max, or C'max≥2.4 L'max. C'max may be up to about 8 times, or up to about 6 times, or up about 5 times L'max, for example.

In some embodiments, in a predetermined wavelength range (e.g., λa to λb) disposed between about 200 nm and about 2000 nm, and for a p-polarized incident light at a first incident angle θ1, optical reflectances of the optical film (optical reflectance C1) and the plurality of polymeric first layers (optical reflectance M1) versus wavelength include respective first and second reflection bands 50 and 70 having respective full width at half maxima FW1 and FW2, and where increasing the incident angle by at least about 40 degrees to a second incident angle θ2 (or by an amount in any range described elsewhere herein), shifts the first and second reflection bands to respective third and fourth reflection bands 50' and 70' at smaller wavelengths with respective full width at half maxima FW'1 and FW'2. FW'1 can be less than FW1 by less than about 30% ((FW1−FW'1)/FW1×100% less than about 30%) and FW'2 can be less than FW2 by more than about 35% ((FW2−FW'2)/FW2×100% more than about 35%). In some embodiments, FW'1 is less than FW1 by less than about 28%, or less than about 27%, or less than about 26%, for example. In some embodiments, FW'2 is less than FW2 by greater than about 38%, or greater than about 40%, or greater than about 41%, for example. In some embodiments, (FW1−FW'1)/FW1×100% is greater than about 5% or greater than about 10%, for example. In some embodiments, (FW2−FW'2)/FW2×100% is less than about 70% or less than about 60%, for example.

Figure 9A:
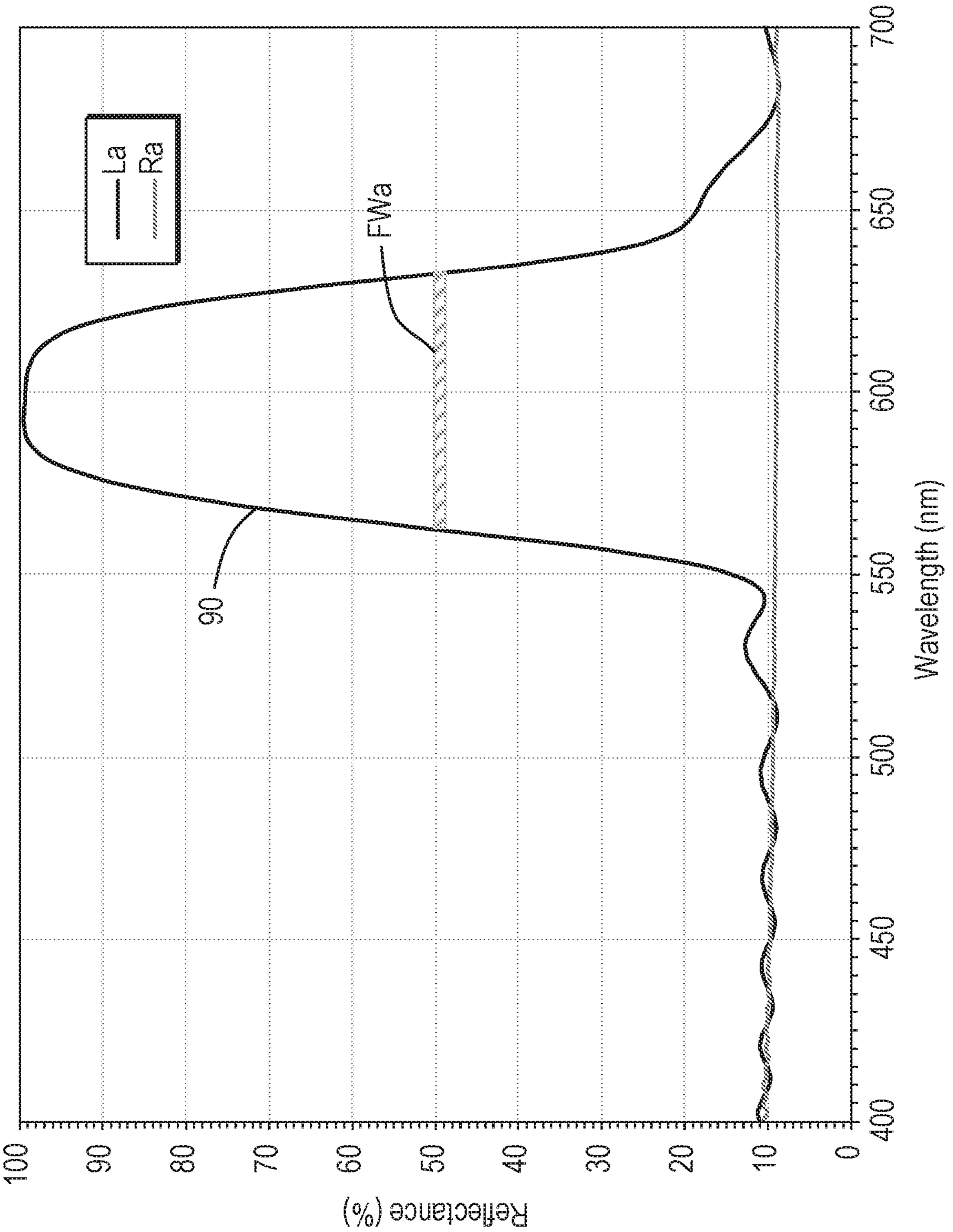
FIGS. 9A-9B are plots of reflectance versus wavelength for pluralities of polymeric first and second layers for respective first and second incident angles, according to some embodiments.
Figure 9B:
Figure 10:
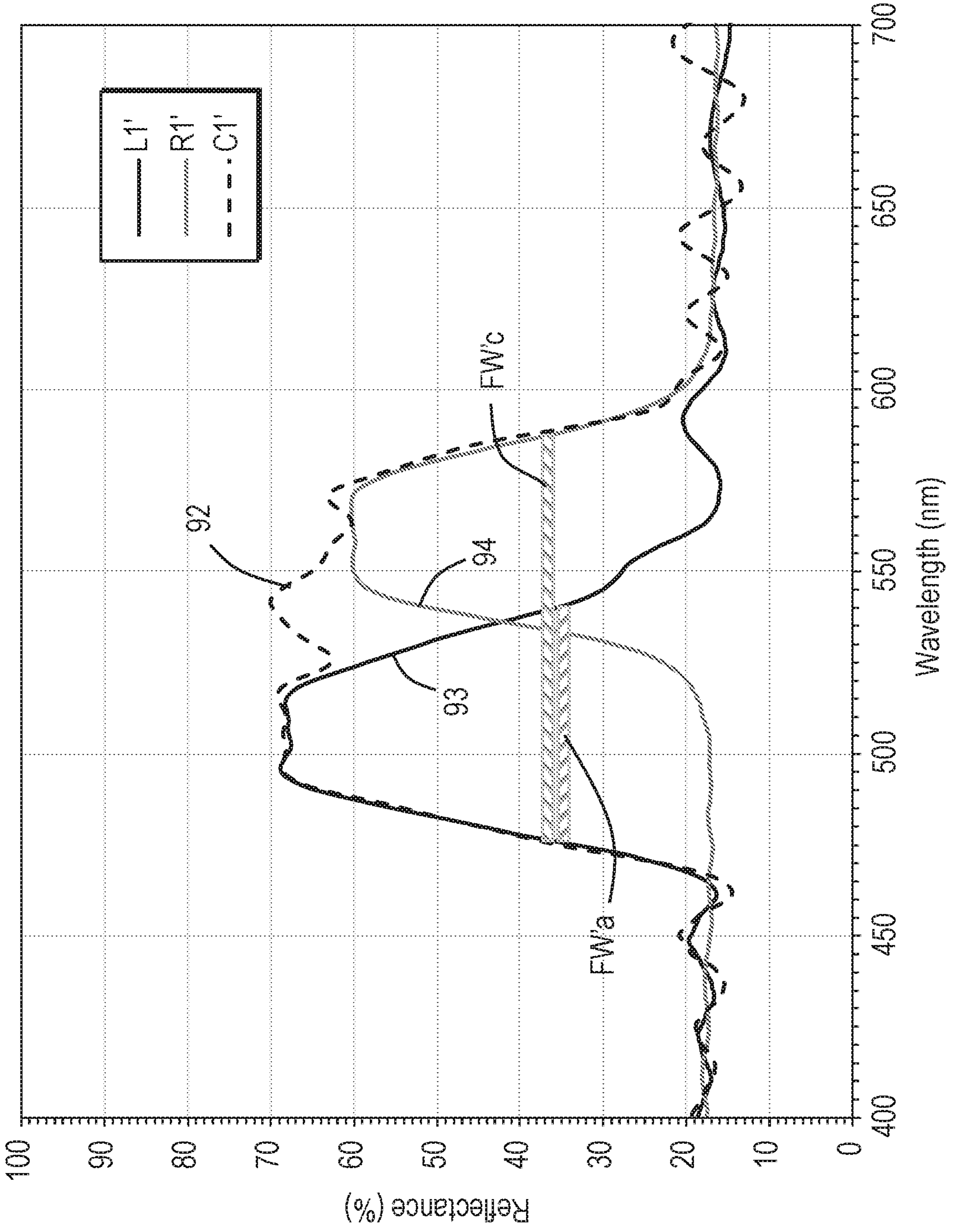
FIG. 10 is a plot of optical reflectance versus wavelength for pluralities of polymeric first and second layers and for the combination of the pluralities of the polymeric first and second layers, according to some embodiments.
Figure 11:
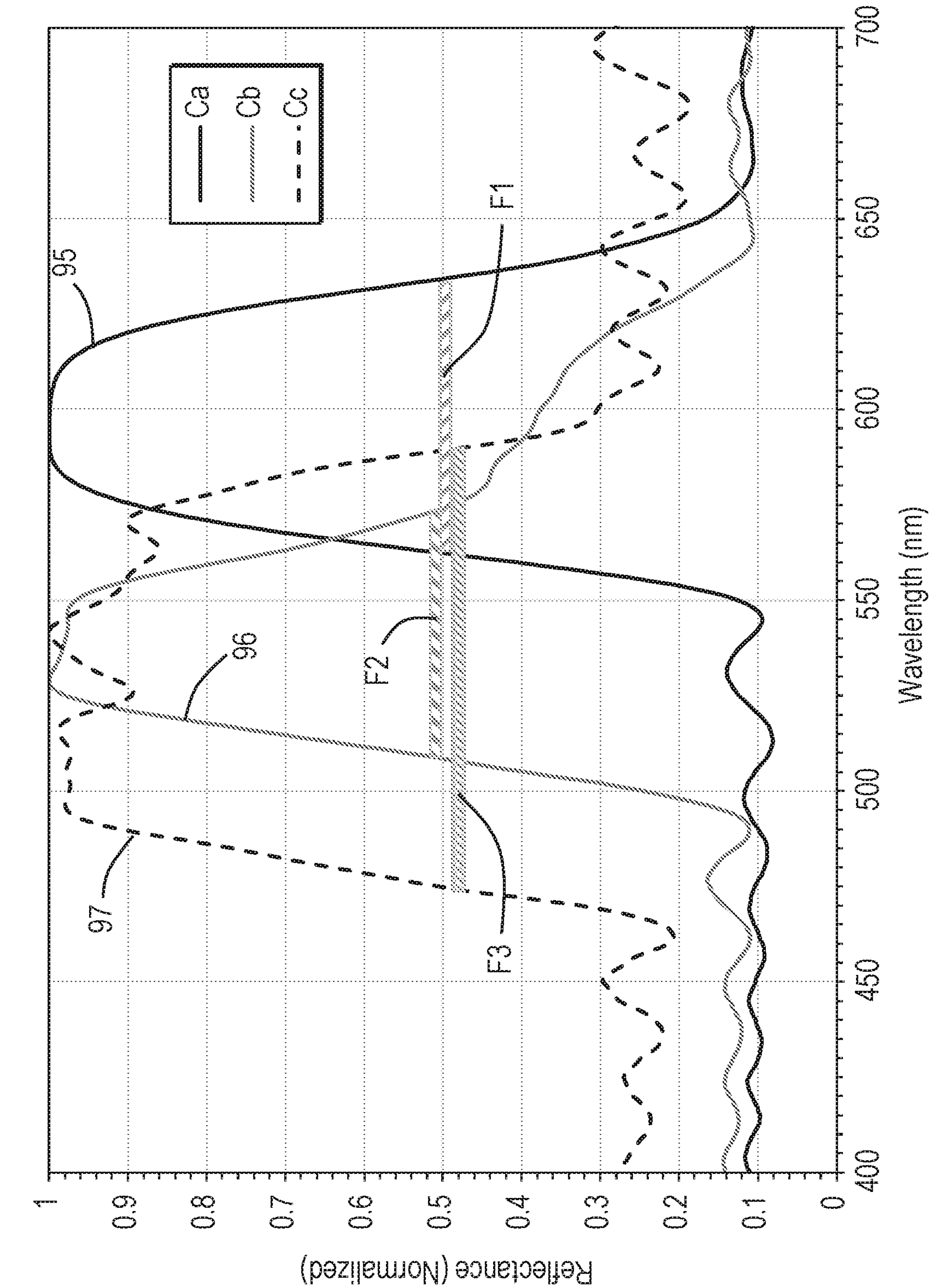
FIG. 11 is a plot of normalized reflectance versus wavelength for an optical film including pluralities of polymeric first and second layers for different incident angles, according to some embodiments.
Figure 12:
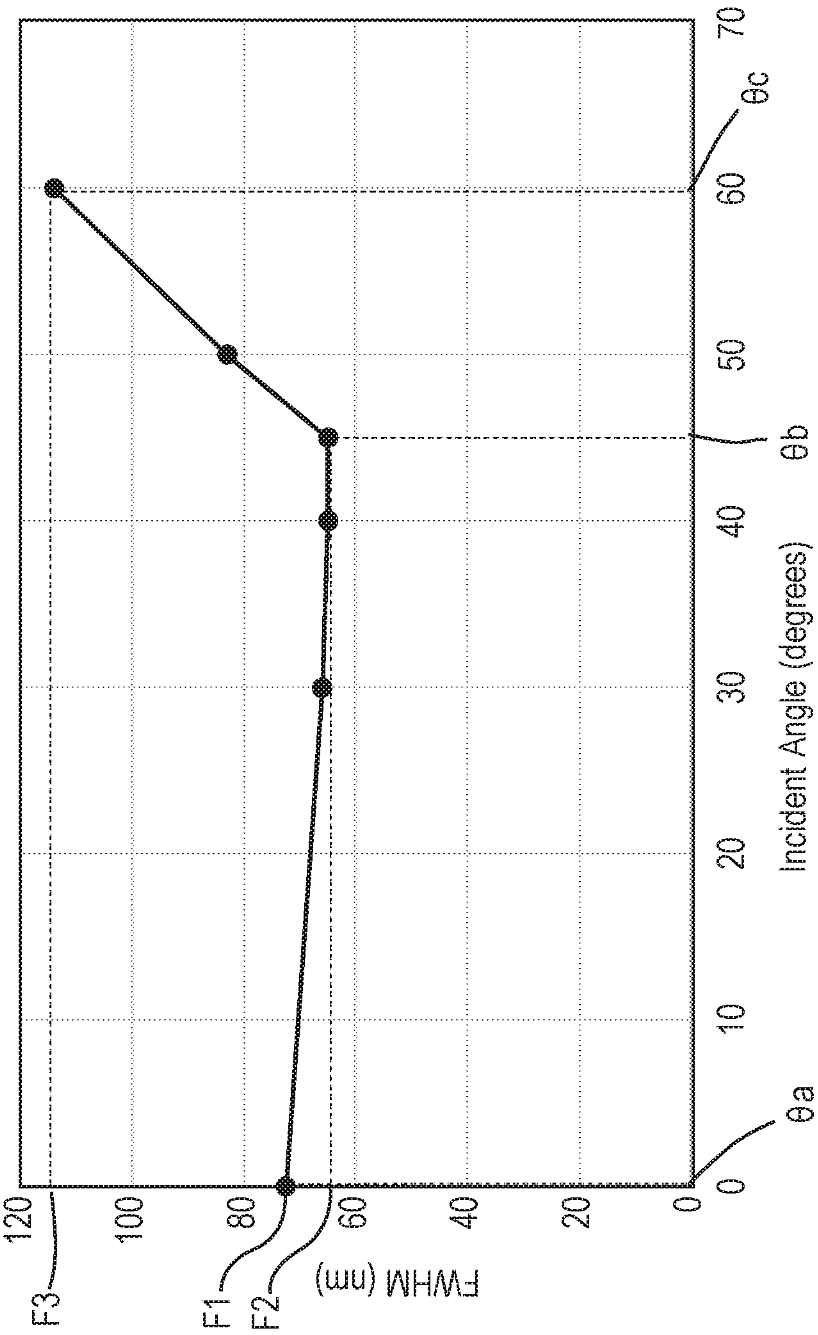
FIG. 12 is a plot of full width at half maximum of a reflection band of an optical film as a function of incident angle, according to some embodiments.

FIGS. 9A-9B are plots of reflectance versus wavelength for pluralities of polymeric first and second layers (e.g., corresponding to LBE and RBE compensators described elsewhere herein) for a first incident angle (FIG. 9A) and for a larger second incident angle (FIG. 9B), according to some embodiments. The plots of FIGS. 9A-9B were calculated as generally described for FIGS. 5A-5C. FIG. 10 is a plot of optical reflectance versus wavelength for pluralities of polymeric first and second layers (e.g., corresponding to LBE and RBE compensators described elsewhere herein) and for the optical film including the pluralities of the polymeric first and second layers for an incident angle that may correspond to the second incident angle of FIG. 9B, according to some embodiments. FIG. 11 is a plot of normalized reflectance versus wavelength for an optical film including pluralities of polymeric first and second layers (e.g., corresponding to LBE and RBE compensators described elsewhere herein) for different incident angles, according to some embodiments. In FIG. 11, each reflectance curve has been normalized by dividing by the maximum reflectance so that each reflectance curve has a maximum value of 1. The optical reflectances Ca, Cb, Cc are for incident angles of 0 degrees, 45 degrees, and 60 degrees, respectively. Full widths at half maximum (FWHM) for these incident angles are schematically indicated in FIG. 11. The reflectance curves of FIG. 11 are scaled so that the maximum reflectance is 1 for each of the illustrated incident angles. FIG. 12 is a plot of FWHM as a function of incident angle, according to some embodiments. The optical films of FIGS. 9A-12 does not include a first or primary reflector in addition to the LBE and RBE compensators.

In some embodiments, a multilayer optical film 100 includes a plurality (e.g., one of 10, 20, or 30) of polymeric first layers disposed on, and integrally formed with, a plurality (e.g., a different one of 10, 20, or 30) of polymeric second layers, where each of the two pluralities includes at least 10 polymeric layers in total (or the total number in each of the pluralities can be in any of the ranges described elsewhere herein) and each of the first and second layers has an average thickness of less than about 500 nm (or the average thickness can be in any range described elsewhere herein for optical layers). The plurality of polymeric first layers may be as described elsewhere herein for an LBE compensator and the plurality of polymeric second layers may be as described elsewhere herein for an RBE compensator. For example, the plurality of polymeric first layers can be or include a plurality of alternating first and second optical layers which can be as described elsewhere herein for an LBE compensator and the plurality of polymeric second layers can be or include a plurality of alternating third and fourth optical layers which can be as described elsewhere herein for an RBE compensator.

In some embodiments, for a p-polarized incident light 40, 40' in a predetermined wavelength range (e.g., λa to λb) that is at least about 200 nm wide and is disposed between about 200 nm and about 2000 nm; for a first incident angle θ1, an optical reflectance of the plurality of polymeric first layers (optical reflectance La), but not the plurality of polymeric second layers (optical reflectance Ra), versus wavelength includes a reflection band 90; and for a second incident angle θ2 greater than the first incident angle θ1 by at least about 40 degrees (or the first and second incident angles can be in any range described elsewhere herein), an optical reflectance of each of the plurality of polymeric first layers (optical reflectance Lb) and the plurality of polymeric second layers (optical reflectance Rb) versus wavelength includes a reflection band 90', 91'. In some embodiments, the reflection band 90 has a full width at half maximum (FWHM) of greater than about 10 nm and each of the reflection bands 90', 91' has a FWHM of greater than about 10 nm. In some such embodiments, or in other embodiments, the FWHM of the reflection band 90 is greater than about 20 nm, or greater than about 30 nm, or greater than about 40 nm, or greater than about 50 nm, or greater than about 60 nm, or greater than about 70 nm. In some such embodiments, or in other embodiments, each of the reflection bands 90', 91' has a FWHM of greater than about 20 nm, or greater than about 30 nm, or greater than about 40 nm, or greater than about 50 nm. Each of the reflection bands 90, 90', 91' may have a FWHM of less than about 300 nm, or less than about 200 nm, or less than about 100 nm, or less than about 90 nm, or less than about 80 nm, for example.

In some embodiments, for a p-polarized incident light 40, 40' in a predetermined wavelength range (e.g., Na to λb) that is at least about 200 nm wide and is disposed between about 200 nm and about 2000 nm, and for at least one incident angle (e.g., at least a first incident angle that may correspond to θ2, for example) greater than about 30 degrees; an optical reflectance of each of the optical film (optical reflectance C1'), the plurality of polymeric first layers (optical reflectance L1'), and the plurality of polymeric second layers (optical reflectance R1') versus wavelength includes a reflection band (respective reflection bands 92, 93, and 94) having a left band edge (LBE) at a short wavelength side of the reflection band where the reflectance generally increases with increasing wavelength, and a right band edge (RBE) at a long wavelength side of the reflection band where the reflectance generally decreases with increasing wavelength, such that the RBE of the optical film substantially overlaps the RBE of one of the pluralities of first and second layers, and the LBE of the optical film substantially overlaps the LBE of the other one of the pluralities of first and second layers. A first band edge may be described as substantially overlapping a second band edge when the band edges are within, for example, about 7 nm or about 5 nm of one another along at least a majority of a length of the second band edge. For example, as illustrated in FIG. 10, the LBE of reflection band 92 substantially overlaps the LBE of reflection band 93 and the RBE of reflection band 92 substantially overlaps the RBE of reflection band 94. The first incident angle can be in any range described elsewhere herein for 02. For example, the first incident angle can be greater than about 35 degrees, or greater than about 40 degrees, or greater than about 45 degrees, or greater than about 50 degrees, or greater than about 55 degrees and may be up to about 80 degrees, for example.

In some embodiments, for a p-polarized incident light 40, 40' in a predetermined wavelength range (e.g., λa to λb) that is at least about 200 nm wide and is disposed between about 200 nm and about 2000 nm; for a first incident angle θ1, an optical reflectance of each of the optical film (optical reflectance Ca of FIG. 11) and the plurality of polymeric first layers (optical reflectance La of FIG. 9A), but not the plurality of polymeric second layers, versus wavelength includes a reflection band 90, 95, where the reflection bands have full width at half maximums (FWHM) within about 20% of each other; and for a second incident angle θ2 greater than the first incident angle θ1 by at least about 40 degrees (or by an amount in a range described elsewhere herein), an optical reflectance of each of the optical film (optical reflectance C1' in FIG. 10) and the plurality of polymeric first layers (optical reflectance L1' in FIG. 10) versus wavelength comprises a reflection band 92, 93, where the reflection bands have FWHMs different by at least about 30%. Reflection band 90 has a FWHM of FWa (see, e.g., FIG. 9A) and reflection band 95 has a FWHM of FW1 (see, e.g., FIG. 11) which can be within about 20%, or within about 15% or within about 10% of each other, for example. Reflection band 92 has a FWHM of FW'c and reflection band 93 has a FWHM of FW'a (see, e.g., FIG. 10) which can be different by at least about 30% (e.g., FW'c−FW'a can be greater than 0.3 FW'a), or by at least about 40%, or at least about 50%, for example. FW'c and FW'a can differ by up to about 200% (e.g., FW'c can be up to about 3 times FW'a), or up to about 150%, for example.

In some embodiments, a multilayer optical film 100 includes a plurality (e.g., at least one of 10, 20, or 30) of layers numbering at least 10 in total where each of the layers has an average thickness of less than about 500 nm (or the average thickness can be in a range described elsewhere herein for optical layers). The total number of the plurality of layers can be in any range described for one or two of the pluralities 10, 20 and 30, for example. The plurality of layers can be or include a plurality of polymeric first layers and a plurality of polymeric second layers where the plurality of polymeric first layers may be as described elsewhere herein for an LBE compensator and the plurality of polymeric second layers may be as described elsewhere herein for an RBE compensator. In some embodiments, for a p-polarized incident light 40, 40' in a predetermined wavelength range (e.g., λa to λb) that is at least about 200 nm wide and is disposed between about 200 nm and about 2000 nm, and for increasing first, second, and third incident angles (and/or for incident angles θa, θb>θa, and θc>θb), an optical reflectance of the optical film versus wavelength includes respective first, second, and third reflection bands 95, 96, and 97 (see, e.g., FIG. 11) having respective full width at half maximums, F1, F2, and F3, where F3>F1>F2. The first incident angle may correspond to 01 illustrated in FIG. 4, the second incident angle may correspond to the incident angle of light 140 illustrated in FIG. 2A, and the third incident angle may correspond to 02 illustrated in FIG. 4, for example. The first, second and third incident angles may be 0 degrees, 45 degrees, and 60 degrees, respectively, for example. In some embodiments, the second incident angle is greater than the first incident angle by at least 30 degrees, and F1 is greater than F2 by less than about 12 nm, or less than about 10 nm, or less than about 9 nm. In some such embodiments, or in other embodiments, F1 is greater than F2 by at least about 5 nm, or at least about 6 nm. In some embodiments, the third incident angle is greater than the first incident angle by at least 45 degrees, and F3 is greater than F1 by at least about 10 nm, or at least about 15 nm, or at least about 20 nm, for example. In some such embodiments, or in other embodiments, F3 is greater than F1 by less than about 80 nm, or less than about 60 nm, or less than about 50 nm, for example. The first, second and third incident angles may alternatively be referred to as θa, θb, and θc, respectively. Exemplary incident angles θa, θb, and θc; and corresponding exemplary FWHMs F1, F2, and F3 are illustrated in FIG. 12. In some embodiments, 0 degrees≤θa<θb<θc<90 degrees. In some such embodiments, or in other embodiments, θc<80 degrees or θc<75 degrees.

Figure 13:
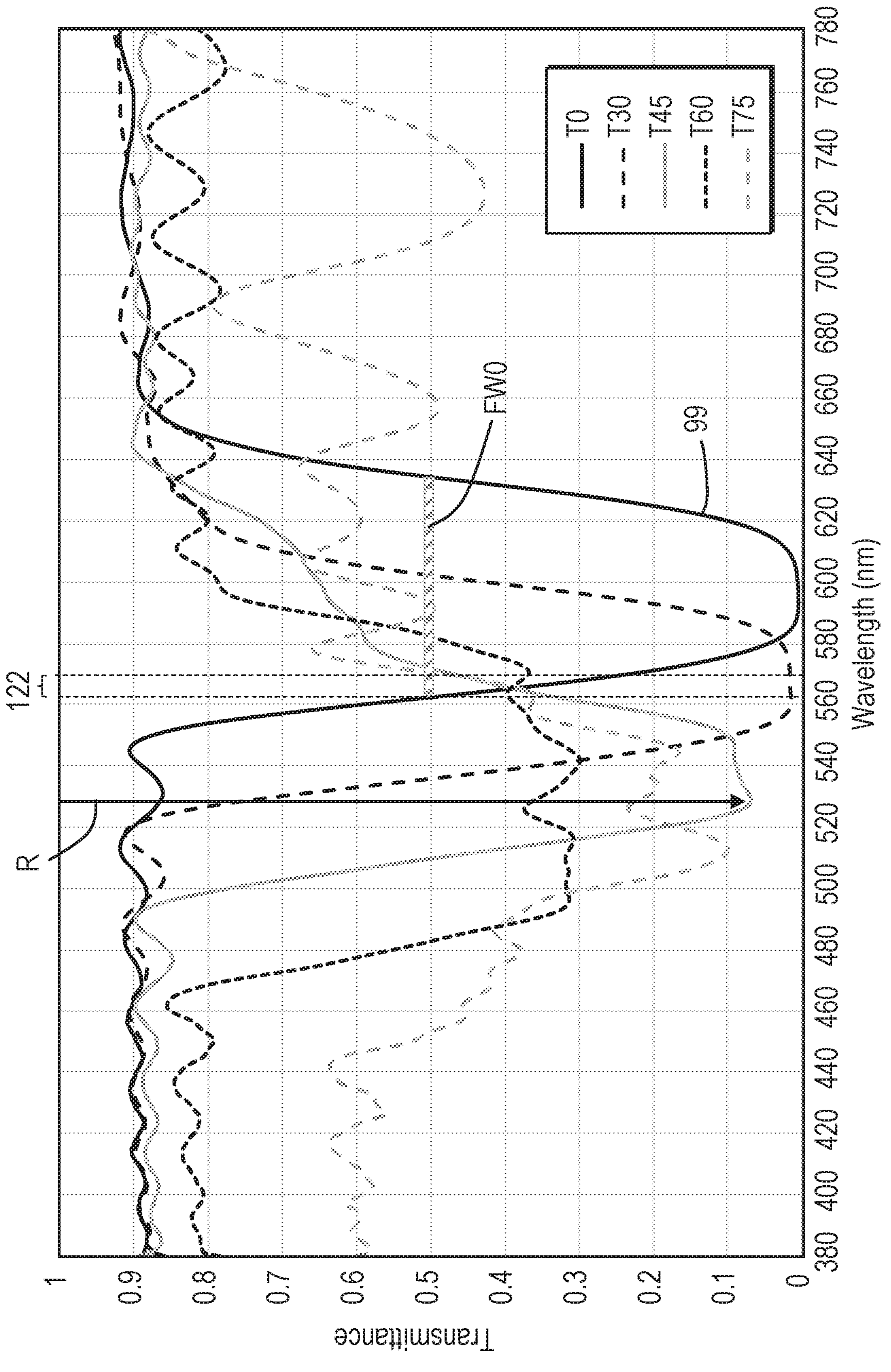
FIG. 13 is a plot of transmittance of a multilayer optical film for unpolarized incident light at various incident angles, according to some embodiments.

FIG. 13 is a plot of transmittance of a multilayer optical film for unpolarized incident light at various incident angles, according to some embodiments. The notation Tw refers to the transmittance for an angle of incidence of w degrees (e.g., T60 is the transmittance for an angle of incidence of 60 degrees). The reflectance R is 1 minus the transmittance to a good approximation since optical absorption is typically negligible. The reflectance has a reflection band 99 having a full width at half maximum (FWHM) of FW0 which is about 72 nm in the illustrated embodiment. There is a range of wavelengths 122 where the reflectance is greater than 50% for each incident angle shown. The optical film of FIG. 13 included RBE and LBE compensators and does not include an additional first or primary reflector.

Figure 14:
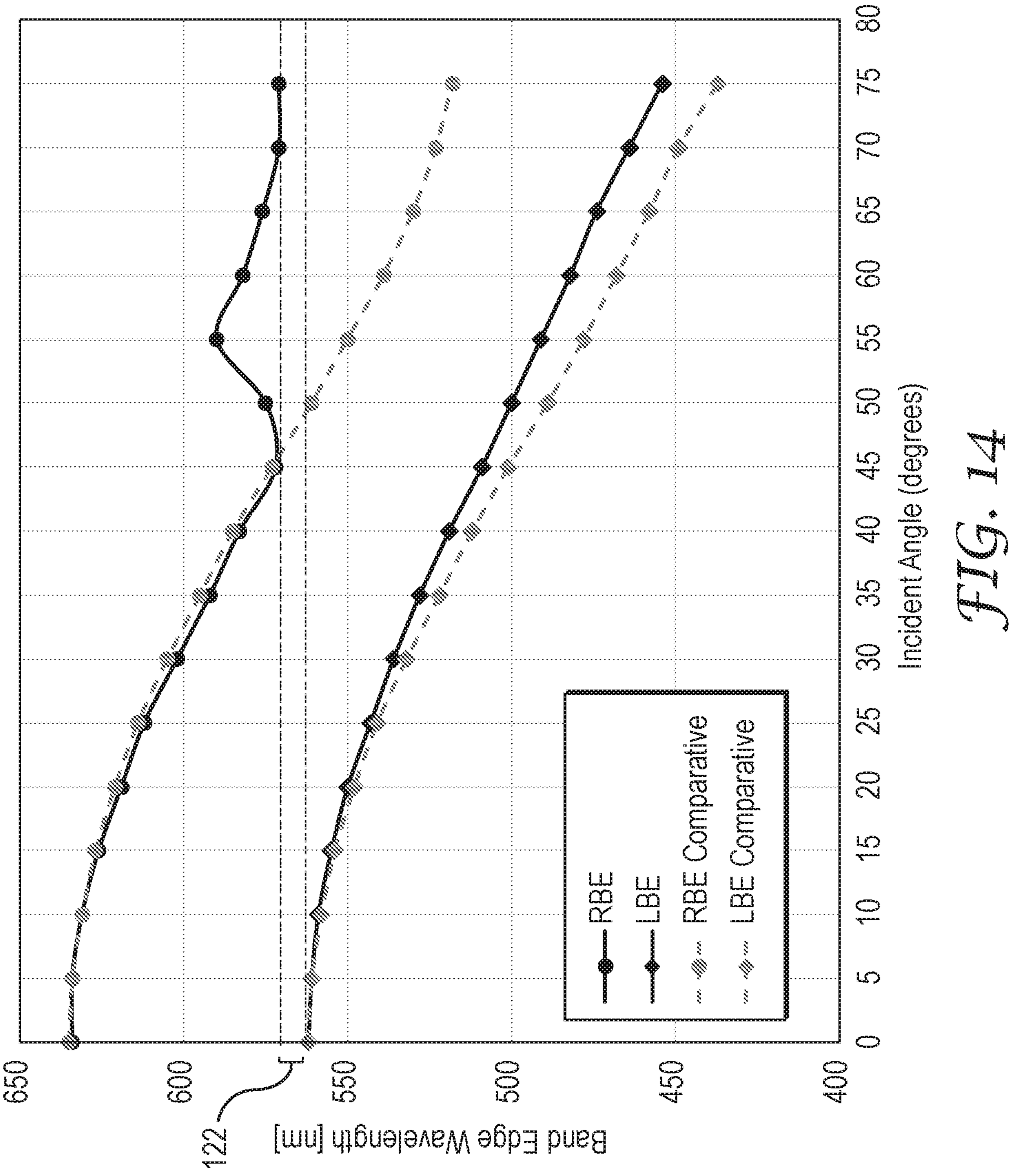
FIG. 14 is a plot of the band edge wavelengths for the optical film of FIG. 13 as a function of incident angle.

FIG. 14 is a plot of the band edge wavelengths for the optical film of FIG. 13 as a function of incident angle. The right and left band edge wavelengths were determined as the wavelength where the transmittance along the band edge is 50%. The right and left band edge wavelengths for a comparative conventional optical mirror having the same band edges at normal incidence are shown for comparison (RBE Comparative and LBE Comparative). For the comparative optical mirror, there is no wavelength where the optical mirror has a reflectance of greater than 50% at each of an angle of incidence of 0 degrees and an angle of incidence of 60 degrees, for example.

In some embodiments, a multilayer optical film 100 includes a plurality (e.g., one of 10, 20, or 30) of alternating first and second polymeric layers disposed on, and integrally formed with, a plurality (e.g., a different one of 10, 20, or 30) of alternating third and fourth polymeric layers where each of the two pluralities include at least 10 polymeric layers in total (or the total number in each plurality can be in any range described elsewhere herein) and each of the first through fourth polymeric layers has an average thickness of less than about 500 nm (or the average thicknesses can be in any of the ranges described elsewhere herein for optical layers). In some embodiments, for an unpolarized incident light 140 in a predetermined wavelength range (e.g., λa to λb) that is disposed between about 200 nm and about 2000 nm, an optical reflectance of the optical film versus wavelength includes a reflection band 99 (see, e.g., FIG. 13) having a full width at half maximum FW0 of less than about 100 nm for at least a first incident angle θ1 less than about 25 degrees, and for at least one first wavelength in the reflection band 99 (e.g., wavelengths in the range 122), the optical reflectance of the optical film is greater than about 50% for each of the first incident angle θ1 and a second incident angle θ2 greater than the first incident angle θ1 by at least about 60 degrees. The first and second incident angles θ1 and 02 can be in any respective range described elsewhere herein. The full width at half maximum FW0 may be less than about 90 nm, or less than about 80 nm, or less than about 75 nm, for example. The full width at half maximum FW0 may be greater than about 30 nm or greater than about 50 nm, for example. In some embodiments, for the at least one first wavelength, the optical reflectance of the optical film is greater than about 55%, or greater than about 58%, or greater than about 60% for each of the first and second incident angles. In some embodiments, for the at least one first wavelength, the optical reflectance of the optical film 100 is greater than about 50% for each incident angle in a range of 0 degrees to about 75 degrees. In some embodiments, the optical film 100 has a maximum reflectance in the predetermined wavelength range of greater than about 80%, or greater than about 85%, or greater than about 90%, or greater than about 95% for substantially normally incident light and for each of two mutually orthogonal polarization states (e.g., polarized along the x-direction and polarized along the y-direction).

The plurality of first and second polymeric layers can be as described elsewhere herein for an RBE compensator. The plurality of third and fourth polymeric layers can be as described elsewhere herein for an LBE compensator. In some embodiments, the first through fourth polymeric layers have respective indices nx1 through nx4 along a same in-plane (xy-plane) x-direction, respective indices ny1 through n4 along an in-plane y-direction orthogonal to the x-direction, and respective indices nz1 through nz4 along a thickness direction (z-direction) of the polymeric layers orthogonal to the x- and y-directions, such that for at least one wavelength in a visible wavelength range extending from about 420 nm to about 680 nm; each of |nx1−nx2| and |ny1−ny2| is less than about 0.02; nz1−nz2 is greater than about 0.03; and nz4−nz3≥nx4−nx3≥0.03. Each of |nx1−nx2| and |ny1−ny2| can be less than about 0.015 or can be in a range described elsewhere herein for an RBE compensator. nz1−nz2 can be greater than about 0.05 or can be in a range described elsewhere herein for an RBE compensator. nz4−nz3 can be greater than or equal to nx4−nx3 which can be greater than or equal to 0.04 or can be in a range described elsewhere herein for an LBE compensator. The at least one wavelength can be about 633 nm or can be other wavelength(s) described elsewhere herein for determining refractive indices. In some embodiments, for each of the first through fourth polymeric layers and for the at least one wavelength in the visible wavelength range, an absolute value of a difference between the refractive index of the layer along the x-direction and the refractive index of the layer along the y-direction is less than about 0.05, or less than about 0.04, or less than about 0.03, or less than about 0.025, or less than about 0.02, or less than about 0.015, or less than about 0.012, or less than about 0.01.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A multilayer optical film comprising a plurality of polymeric first layers numbering at least 10 in total disposed on a plurality of polymeric second layers numbering at least 10 in total, each of the first and second layers having an average thickness of less than about 500 nm, such that in a predetermined wavelength range that is at least about 200 nm wide and is disposed between about 200 nm and about 2000 nm, for a p-polarized incident light, and for each of a first incident angle and a second incident angle greater than the first incident angle by at least about 40 degrees:

an optical reflectance of each of the optical film and the plurality of polymeric first layers versus wavelength comprises a reflection band comprising a left band edge (LBE) at a short wavelength side of the reflection band where the reflectance generally increases with increasing wavelength, and a right band edge (RBE) at a long wavelength side of the reflection band where the reflectance generally decreases with increasing wavelength, such that a separation between the RBEs of the optical film and the first layers is less than a separation between the LBEs of the optical film and the first layers for the first incident angle, and a separation between the RBEs of the optical film and the first layers is greater than a separation between the LBEs of the optical film and the first layers for the second incident angle.

2. The multilayer optical film of claim 1, wherein the plurality of polymeric second layers comprises a plurality of alternating first and second optical layers comprising respective refractive indices nx1 and nx2 along a same in-plane x-direction, respective refractive indices ny1 and ny2 along an in-plane y-direction orthogonal to the x-direction, and respective refractive indices nz1 and nz2 along a thickness direction of the polymeric second layers orthogonal to the x- and y-directions, wherein for at least one wavelength in the predetermined wavelength range:

each of $|nx1-nx2|$ and $|ny1-ny2|$ is less than about 0.02; and $nz1-nz2$ is greater than about 0.03.

3. The multilayer optical film of claim 2 further comprising a plurality of polymeric third layers numbering at least 10 in total, each of the third layers having an average thickness of less than about 500 nm, the plurality of polymeric third layers comprising a plurality of alternating third and fourth optical layers comprising respective refractive indices nx3 and nx4 along a same in-plane x-direction, respective refractive indices ny3 and ny4 along an in-plane y-direction orthogonal to the x-direction, and respective refractive indices nz3 and nz4 along a thickness direction of the polymeric third layers orthogonal to the x- and y-directions, wherein for at least one wavelength in the predetermined wavelength range, $nz4-nz3 \geq nx4-nx3 \geq 0.02$.

4. The multilayer optical film of claim 2, wherein for the p-polarized incident light and the first incident angle, an optical reflectance versus wavelength of the plurality of polymeric second layers does not comprise a reflection band in the predetermined wavelength range.

5. The multilayer optical film of claim 4, wherein in the predetermined wavelength range and for the p-polarized incident light:

for the first incident angle, the optical film has a peak optical reflectance of greater than about 50%, and the plurality of polymeric second layers has a substantially constant optical reflectance having a standard deviation of less than about 3%; and for the second incident angle, the optical film and the plurality of polymeric second layers each has a peak optical reflectance of greater than about 40%.

6. The multilayer optical film of claim 1, wherein the reflection band for each of the optical film and the plurality of polymeric first layers comprises a full width at half maximum (FWHM), such that for the first incident angle, at least one of the two FWHMs overlaps at least 50% of the other one of the two FWHMs, and for the second incident angle, wavelengths at the half maximum reflectances along the RBEs of the optical film and the first layers shift to smaller wavelengths by CS and MS, respectively, CS being less than MS by at least about 10 nm.

* * * * *